US010621019B1

(12) United States Patent
Faulhaber, Jr. et al.

(10) Patent No.: US 10,621,019 B1
(45) Date of Patent: Apr. 14, 2020

(54) USING A CLIENT TO MANAGE REMOTE MACHINE LEARNING JOBS

(71) Applicant: Amazon Technologies, Inc., Seattle, WA (US)

(72) Inventors: Thomas Albert Faulhaber, Jr., Seattle, WA (US); Leo Parker Dirac, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/919,179

(22) Filed: Mar. 12, 2018

Related U.S. Application Data

(60) Provisional application No. 62/590,230, filed on Nov. 22, 2017.

(51) Int. Cl.
| | |
|---|---|
| *G06F 3/00* | (2006.01) |
| *G06F 9/54* | (2006.01) |
| *G06F 9/455* | (2018.01) |
| *G06N 5/04* | (2006.01) |
| *G06N 20/00* | (2019.01) |

(52) U.S. Cl.
CPC .......... *G06F 9/547* (2013.01); *G06F 9/45558* (2013.01); *G06N 5/04* (2013.01); *G06N 20/00* (2019.01); *G06F 2009/45575* (2013.01)

(58) Field of Classification Search
CPC ........................................................ G06F 9/54
USPC ........................................................ 719/310
See application file for complete search history.

(56) References Cited

U.S. PATENT DOCUMENTS

| | | | | |
|---|---|---|---|---|
| 2018/0300653 | A1* | 10/2018 | Srinivasan | H04L 67/322 |
| 2018/0324204 | A1* | 11/2018 | McClory | H04L 41/5041 |
| 2019/0114672 | A1* | 4/2019 | Jacobs | G06Q 30/0269 |

OTHER PUBLICATIONS

Yingjie, The Improved Job Scheduling Algorithm of Hadoop Platform (Year: 2015).*

* cited by examiner

*Primary Examiner* — Lechi Truong
(74) *Attorney, Agent, or Firm* — Nicholson De Vos Webster & Elliott

(57) ABSTRACT

Methods, apparatuses, and systems for a web services provider to interact with a client on remote job execution. For example, a web services provider may receive a job command, from an interactive programming environment of a client, applicable to job for a machine learning algorithm on a web services provider system, process the job command using at least one of a training instance and an inference instance, and provide metrics and log data during the processing of the job to the interactive programming environment.

19 Claims, 28 Drawing Sheets

```
PUT /TRAININGJOBS/TRAININGJOBNAME HTTP/1.1
CONTENT-TYPE: APPLICATION/JSON
{
"ALGORITHMSPECIFICATION": {
        "TRAININGIMAGE": "STRING",
        "TRAININGINPUTMODE": "STRING"
},
"HYPERPARAMETERS": {
        "STRING" : "STRING"
},
"INPUTDATACONFIG": [
    {
        "CHANNELNAME": "STRING",
        "COMPRESSIONTYPE": "STRING",
        "CONTENTTYPE": "STRING",
        "DATASOURCE": {
            "S3DATASOURCE": {
                "S3DATADISTRIBUTIONTYPE": "STRING",
                "S3DATATYPE": "STRING",
                "S3URI": "STRING"
            }
        },
        "RECORDWRAPPERTYPE": "STRING"
    }
],
        "OUTPUTDATACONFIG": {
            "KMSKEYID": "STRING",
            "S3OUTPUTPATH": "STRING"
},
"RESOURCECONFIG": {
        "INSTANCECOUNT": NUMBER,
        "INSTANCETYPE": "STRING",
        "VOLUMESIZEINGB": NUMBER
},
"ROLERN": "STRING",

"STOPPINGCONDITION": {
        "MAXRUNTIMEINHOURS": NUMBER
},
"TAGS": [
    {
        "KEY": "STRING",
        "VALUE": "STRING"
    }
]
}
```

Labels: 1601 (ALGORITHMSPECIFICATION), 1603 (HYPERPARAMETERS), 1605 (INPUTDATACONFIG), 1607 (OUTPUTDATACONFIG), 1609 (RESOURCECONFIG), 1611 (ROLERN), 1613 (STOPPINGCONDITION)

*FIG. 16*

USING A CLIENT TO MANAGE REMOTE MACHINE LEARNING JOBS

CROSS-REFERENCE TO RELATED APPLICATIONS

This application claims the benefit of U.S. Provisional Application No. 62/590,230, filed Nov. 22, 2017, which is hereby incorporated by reference.

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center.

BRIEF DESCRIPTION OF DRAWINGS

Various embodiments in accordance with the present disclosure will be described with reference to the drawings, in which:

FIGS. 15-21 illustrate more specific embodiments of handling job commands in a model training system of a web services provider or model evaluation system of a web services provider as described earlier.

DETAILED DESCRIPTION

Figure 1:
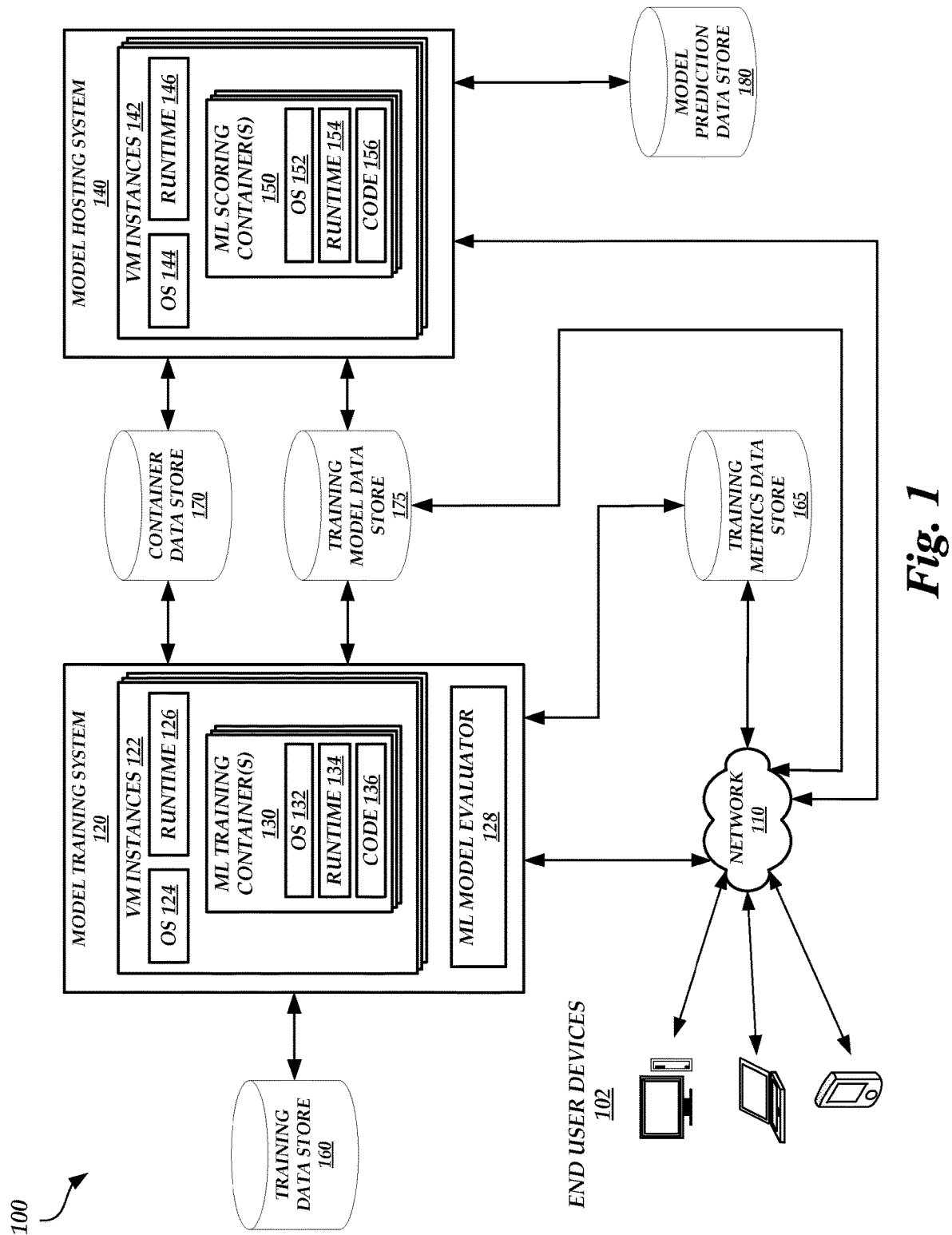
FIG. 1 is a block diagram of an illustrative operating environment in which machine learning models are trained and hosted, in some embodiments.

Various embodiments of methods, apparatus, systems, and non-transitory computer-readable storage media for allowing a user to run or manage a machine learning training job (or jobs) across potentially hundreds of execution instances in a web service (e.g., a cloud-based web service) and to interact directly with those jobs from an interactive programming environment (such as a notebook or a statistical workbench). From the user's perspective, it appears that those machine learning job(s) are running on the user's own machine. The user is able to monitor the jobs (graphically, if their environment supports it), and, in some embodiments, perform one or more actions such as pausing, resuming, stopping, or modifying a running job. In some embodiments, output from a job is routed to the user's local environment as if it was regular output. In some embodiments, the user can pause or stop a running job, and can restart the job to get a complete interactive experience.

As described above, embodiments enable a single physical computing device (or multiple physical computing devices) to host one or more instances of virtual machines that appear and operate as independent computing devices to users. In some embodiments, a service provider can leverage virtualization technologies to provide a network-accessible machine learning service, such as the network-accessible machine learning model training and hosting system described herein. For example, the service provider can operate one or more physical computing devices accessible to user devices via a network. These physical computing device(s) can host virtual machine instances that are configured to train and/or execute machine learning models in response to commands received from user devices.

The embodiments described herein provide several technical benefits over conventional computing systems configured to train machine learning models. For example, training machine learning models can result in the usage of a large amount of processing power because machine learning models can be very complex and the amount of data used to train the models can be very large (e.g., in the gigabytes, terabytes, petabytes, etc.). Thus, some users acquire large conventional computing machines to perform the training. Users, however, may customize these conventional computing machines with specific software to execute the desired model training. On the other hand, embodiments described herein provide an environment in which users do not have to generate and implement a large amount of customized code. Rather, users can simply provide just enough information to define a type of machine learning model to train, and the embodiments described herein can automatically initialize virtual machine instances, initialize containers, and/or perform other operations to implement a model training service.

On the other hand, embodiments described herein are configured to distribute the training across different physical computing devices in some embodiments. Thus, the time to train a model can be significantly reduced.

Valuable time can be lost if the resulting trained model turns out to be inaccurate. On the other hand, embodiments described herein can periodically evaluate models during the training process and output metrics corresponding to the evaluation. Thus, users can review the metrics to determine if, for example, a machine learning model being trained is inaccurate and whether it may be beneficial for the training job to be stopped.

Users can experience significant machine learning model training delays if a conventional computing machine is already in the process of training another model. On the other hand, embodiments described herein dynamically allocate computing resources to perform model training based on user demand in some embodiments. Thus, if a single user or multiple users desire to train multiple machine learning models during an overlapping time period, the trainings can be performed simultaneously.

These services, however, are generally restricted to a single type of machine learning model and only allow prescribed data input formats. Users, on the other hand, may desire to train and use many different types of machine learning models that can receive different types of input data formats. Unlike these conventional services, embodiments described herein provide a flexible execution environment in which machine learning models can be trained and executed irrespective of the type of machine learning model, the programming language in which the machine learning model is defined, the data input format of the machine learning model, and/or the data output format of the machine learning model.

Example Machine Learning Model Training and Hosting Environment

FIG. 1 is a block diagram of an illustrative operating environment 100 in which machine learning models are trained and hosted, in some embodiments. The operating environment 100 includes end user devices 102, a model training system 120, a model hosting system 140, a training data store 160, a training metrics data store 165, a container data store 170, a training model data store 175, and a model prediction data store 180.

Example Model Training System

In some embodiments, users, by way of user devices 102, interact with the model training system 120 to provide data that causes the model training system 120 to train one or more machine learning models. The user devices 102 can interact with the model training system 120 via frontend 129 of the model training system 120. For example, a user device 102 can provide a training request to the frontend 129 that includes a container image (or multiple container images), an indicator of input data (e.g., an address or location of input data), hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 102, from an algorithm repository (e.g., a network-accessible marketplace, a data store provided by a machine learning training service, etc.). In some embodiments, the algorithm is user-generated.

In some embodiments, instead of providing a container image in the training request, the user device 102 merely provides, in the training request, an algorithm written in any programming language. The model training system 120 then packages the algorithm into a container that is eventually loaded into a virtual machine instance 122 for training a machine learning model, as described in greater detail below.

In some embodiments, instead of providing a container image in the training request, the user device 102 provides, in the training request, an indicator of a container image (e.g., an indication of an address or a stored location of a container image). For example, the container image can be stored in the container data store 170. The model training system 120 can then retrieve the container image from the indicated location and create a container using the retrieved container image. The container is then loaded into a virtual machine instance 122 for training a machine learning model, as described in greater detail below.

The model training system 120 can use the information provided by the user device 102 to train a machine learning model in one or more pre-established virtual machine instances 122 in some embodiments. In particular, the model training system 120 includes a single physical computing device or multiple physical computing devices that are interconnected using one or more computing networks (not shown), where the physical computing device(s) host one or more virtual machine instances 122. The model training system 120 can handle the acquisition and configuration of compute capacity (e.g., containers, instances, etc., which are described in greater detail below) based on the information describing the computing machine on which to train a machine learning model provided by the user device 102. The model training system 120 can then train machine learning models using the compute capacity, as is described in greater detail below. The model training system 120 can automatically scale up and down based on the volume of training requests received from user devices 102 via frontend 129, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 122 are utilized to execute tasks. For example, such tasks can include training a machine learning model. As shown in FIG. 1, each virtual machine instance 122 includes an operating system (OS) 124, a language runtime 126, and one or more machine learning (ML) training containers 130. Generally, the ML training containers 130 are logical units created within a virtual machine instance using the resources available on that instance, and can be utilized to isolate execution of a task from other processes (e.g., task executions) occurring in the instance. In some embodiments, the ML training containers 130 are formed from one or more container images and a top container layer. Each container image further includes one or more image layers, where each image layer represents an executable instruction. As described above, some or all of the executable instructions together represent an algorithm that defines a machine learning model. Changes made to the ML training containers 130 (e.g., creation of new files, modification of existing files, deletion of files, etc.) are stored in the top container layer. If a ML training container 130 is deleted, the top container layer is also deleted. However, the container image(s) that form a portion of the deleted ML training container 130 can remain unchanged. The ML training containers 130 can be implemented, for example, as Linux containers.

The ML training containers 130 each include individual copies of an OS 132, runtime 134, and code 136 in some embodiments. The OS 132 and/or the runtime 134 can be defined by one or more executable instructions that form at least a portion of a container image that is used to form the ML training container 130 (e.g., the executable instruction(s) in the container image that define the operating system and/or runtime to run in the container formed from the container image). The code 136 includes one or more executable instructions that form at least a portion of a container image that is used to form the ML training container 130. For example, the code 136 includes the executable instructions in the container image that represent an algorithm that defines a machine learning model. The OS 132 and/or runtime 134 are configured to execute the code 136 in response to an instruction to begin machine learning model training. Execution of the code 136 results in the generation of model data, as described in greater detail below.

In some embodiments, the code 136 includes executable instructions that represent algorithms that define different machine learning models. For example, the code 136 includes one set of executable instructions that represent a first algorithm that defines a first machine learning model and a second set of executable instructions that represent a second algorithm that defines a second machine learning model. In some embodiments, the virtual machine instance 122 executes the code 136 and trains all of the machine learning models. In some embodiments, the virtual machine instance 122 executes the code 136, selecting one of the machine learning models to train. For example, the virtual machine instance 122 can identify a type of training data indicated by the training request and select a machine learning model to train (e.g., execute the executable instructions that represent an algorithm that defines the selected machine learning model) that corresponds with the identified type of training data.

In some embodiments, the OS 132 and the runtime 134 are the same as the OS 124 and runtime 126 utilized by the virtual machine instance 122. In some embodiments, the OS 132 and/or the runtime 134 are different than the OS 124 and/or runtime 126 utilized by the virtual machine instance 122.

In some embodiments, the model training system 120 uses one or more container images included in a training request (or a container image retrieved from the container data store 170 in response to a received training request) to create and initialize a ML training container 130 in a virtual machine instance 122. For example, the model training system 120 creates a ML training container 130 that includes the container image(s) and/or a top container layer.

Prior to beginning the training process, in some embodiments, the model training system 120 retrieves training data from the location indicated in the training request. For example, the location indicated in the training request can be a location in the training data store 160. Thus, the model training system 120 retrieves the training data from the indicated location in the training data store 160. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 122 training the machine learning model. Once the virtual machine instance 122 has applied and used the retrieved portion or once the virtual machine instance 122 is about to use all of the retrieved portion (e.g., a buffer storing the retrieved portion is nearly empty), then the model training system 120 can retrieve a second portion of the training data and provide the second retrieved portion to the virtual machine instance 122, and so on.

To perform the machine learning model training, the virtual machine instance 122 executes code 136 stored in the ML training container 130 in some embodiments. For example, the code 136 includes some or all of the executable instructions that form the container image of the ML training container 130 initialized therein. Thus, the virtual machine instance 122 executes some or all of the executable instructions that form the container image of the ML training container 130 initialized therein to train a machine learning model. The virtual machine instance 122 executes some or all of the executable instructions according to the hyperparameter values included in the training request. As an illustrative example, the virtual machine instance 122 trains a machine learning model by identifying values for certain parameters (e.g., coefficients, weights, centroids, etc.). The identified values depend on hyperparameters that define how the training is performed. Thus, the virtual machine instance 122 can execute the executable instructions to initiate a machine learning model training process, where the training process is run using the hyperparameter values included in the training request. Execution of the executable instructions can include the virtual machine instance 122 applying the training data retrieved by the model training system 120 as input parameters to some or all of the instructions being executed.

In some embodiments, executing the executable instructions causes the virtual machine instance 122 (e.g., the ML training container 130) to generate model data. For example, the ML training container 130 generates model data and stores the model data in a file system of the ML training container 130. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 130 such that the model data is written to the top container layer of the ML training container 130 and/or the container image(s) that forms a portion of the ML training container 130 is modified to include the model data.

The virtual machine instance 122 (or the model training system 120 itself) pulls the generated model data from the ML training container 130 and stores the generated model data in the training model data store 175 in an entry associated with the virtual machine instance 122 and/or the machine learning model being trained. In some embodiments, the virtual machine instance 122 generates a single file that includes model data and stores the single file in the training model data store 175. In some embodiments, the virtual machine instance 122 generates multiple files during the course of training a machine learning model, where each file includes model data. In some embodiments, each model data file includes the same or different model data information (e.g., one file identifying the structure of an algorithm, another file includes a list of coefficients, etc.). The virtual machine instance 122 can package the multiple files into a single file once training is complete and store the single file in the training model data store 175. Alternatively, the virtual machine instance 122 stores the multiple files in the training model data store 175. The virtual machine instance 122 stores the file(s) in the training model data store 175 while the training process is ongoing and/or after the training process is complete.

In some embodiments, the virtual machine instance 122 regularly stores model data file(s) in the training model data store 175 as the training process is ongoing. Thus, model data file(s) can be stored in the training model data store 175 at different times during the training process. Each set of model data files corresponding to a particular time or each set of model data files present in the training model data store 175 as of a particular time could be checkpoints that represent different versions of a partially trained machine learning model during different stages of the training process. Accordingly, before training is complete, a user, via the user device 102 can submit a deployment and/or execution request in a manner as described below to deploy and/or execute a version of a partially trained machine learning model (e.g., a machine learning model trained as of a certain stage in the training process). A version of a partially trained machine learning model can be based on some or all of the model data files stored in the training model data store 175.

In some embodiments, a virtual machine instance 122 executes code 136 stored in a plurality of ML training containers 130. For example, the algorithm included in the container image can be in a format that allows for the parallelization of the training process. Thus, the model training system 120 can create multiple copies of the container image provided in a training request and cause the virtual machine instance 122 to load each container image copy in a separate ML training container 130. The virtual machine instance 122 can then execute, in parallel, the code 136 stored in the ML training containers 130. The virtual machine instance 122 can further provide configuration information to each ML training container 130 (e.g., information indicating that N ML training containers 130 are collectively training a machine learning model and that a particular ML training container 130 receiving the configuration information is ML training container 130 number X of N), which can be included in the resulting model data. By parallelizing the training process, the model training system 120 can significantly reduce the training time in some embodiments.

In some embodiments, a plurality of virtual machine instances 122 execute code 136 stored in a plurality of ML training containers 130. For example, the resources used to train a particular machine learning model can exceed the limitations of a single virtual machine instance 122. However, the algorithm included in the container image can be in a format that allows for the parallelization of the training process. Thus, the model training system 120 can create multiple copies of the container image provided in a training request, initialize multiple virtual machine instances 122, and cause each virtual machine instance 122 to load a container image copy in one or more separate ML training containers 130. The virtual machine instances 122 can then each execute the code 136 stored in the ML training containers 130 in parallel. The model training system 120 can further provide configuration information to each ML training container 130 via the virtual machine instances 122 (e.g., information indicating that N ML training containers 130 are collectively training a machine learning model and that a particular ML training container 130 receiving the configuration information is ML training container 130 number X of N, information indicating that M virtual machine instances 122 are collectively training a machine learning model and that a particular ML training container 130 receiving the configuration information is initialized in virtual machine instance 122 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 122 that execute the code 136. Thus, the parallelization can occur over different physical computing devices in addition to over different virtual machine instances 122 and/or ML training containers 130.

In some embodiments, the model training system 120 includes a ML model evaluator 128. The ML model evaluator 128 can monitor virtual machine instances 122 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 128 can obtain the model data for a machine learning model being trained and evaluation data from the training data store 160. The evaluation data is separate from the data used to train a machine learning model and includes both input data and expected outputs (e.g., known results), and thus the ML model evaluator 128 can define a machine learning model using the model data and execute the machine learning model by providing the input data as inputs to the machine learning model. The ML model evaluator 128 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 128 periodically generates model metrics during the training process and stores the model metrics in the training metrics data store 165 in some embodiments. While the machine learning model is being trained, a user, via the user device 102, can access and retrieve the model metrics from the training metrics data store 165. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 102, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 122 to optionally delete an existing ML training container 130, create and initialize a new ML training container 130 using some or all of the information included in the request, and execute the code 136 stored in the new ML training container 130 to restart the machine learning model training process. As another example, the model training system 120 can cause the virtual machine instance 122 to modify the execution of code stored in an existing ML training container 130 according to the data provided in the modification request. In some embodiments, the user, via the user device 102, can transmit a request to the model training system 120 to stop the machine learning model training process. The model training system 120 can then instruct the virtual machine instance 122 to delete the ML training container 130 and/or to delete any model data stored in the training model data store 175.

As described below, in some embodiments, the model data stored in the training model data store 175 is used by the model hosting system 140 to deploy machine learning models. Alternatively or in addition, a user device 102 or another computing device (not shown) can retrieve the model data from the training model data store 175 to implement a learning algorithm in an external device. As an illustrative example, a robotic device can include sensors to capture input data. A user device 102 can retrieve the model data from the training model data store 175 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 122 are shown in FIG. 1 as a single grouping of virtual machine instances 122, some embodiments of the present application separate virtual machine instances 122 that are actively assigned to execute tasks from those virtual machine instances 122 that are not actively assigned to execute tasks. For example, those virtual machine instances 122 actively assigned to execute tasks are grouped into an "active pool," while those virtual machine instances 122 not actively assigned to execute tasks are placed within a "warming pool." In some embodiments, those virtual machine instances 122 within the warming pool can be pre-initialized with an operating system, language runtimes, and/or other software required to enable rapid execution of tasks (e.g., rapid initialization of machine learning model training in ML training container(s) 130) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 102, the model hosting system 140, etc.). The processing unit can also communicate to and from a memory of a virtual machine instance 122 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

Example Model Hosting System

In some embodiments, the model hosting system 140 includes a single physical computing device or multiple physical computing devices that are interconnected using one or more computing networks (not shown), where the physical computing device(s) host one or more virtual machine instances 142. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 102 via frontend 149 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 142 are utilized to execute tasks. For example, such tasks can include executing a machine learning model. As shown in FIG. 1, each virtual machine instance 142 includes an operating system (OS) 144, a language runtime 146, and one or more ML scoring containers 150. The ML scoring containers 150 are similar to the ML training containers 130 in that the ML scoring containers 150 are logical units created within a virtual machine instance using the resources available on that instance, and can be utilized to isolate execution of a task from other processes (e.g., task executions) occurring in the instance. In some embodiments, the ML scoring containers 150 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 150 (e.g., creation of new files, modification of existing files, deletion of files, etc.) are stored in the top container layer. If a ML scoring container 150 is deleted, the top container layer is also deleted. However, the container image(s) that form a portion of the deleted ML scoring container 150 can remain unchanged. The ML scoring containers 150 can be implemented, for example, as Linux containers.

The ML scoring containers 150 each include individual copies of an OS 152, runtime 154, and code 156 in some embodiments. The OS 152 and/or the runtime 154 can be defined by one or more executable instructions that form at least a portion of a container image that is used to form the ML scoring container 150 (e.g., the executable instruction(s) in the container image that define the operating system and/or runtime to run in the container formed from the container image). The code 156 includes one or more executable instructions that form at least a portion of a container image that is used to form the ML scoring container 150. For example, the code 156 includes the executable instructions in the container image that represent an algorithm that defines a machine learning model. The code 156 can also include model data that represent characteristics of the defined machine learning model, as described in greater detail below. The OS 152 and/or runtime 154 are configured to execute the code 156 in response to an instruction to begin execution of a machine learning model. Execution of the code 156 results in the generation of outputs (e.g., predicted results), as described in greater detail below.

In some embodiments, the OS 152 and the runtime 154 are the same as the OS 144 and runtime 146 utilized by the virtual machine instance 142. In some embodiments, the OS 152 and/or the runtime 154 are different than the OS 144 and/or runtime 146 utilized by the virtual machine instance 142.

In some embodiments, the model hosting system 140 uses one or more container images included in a deployment request (or a container image retrieved from the container data store 170 in response to a received deployment request) to create and initialize a ML scoring container 150 in a virtual machine instance 142. For example, the model hosting system 140 creates a ML scoring container 150 that includes the container image(s) and/or a top container layer.

As described above, a user device 102 can submit a deployment request and/or an execution request to the model hosting system 140 via the frontend 149 in some embodiments. A deployment request causes the model hosting system 140 to deploy a trained machine learning model into a virtual machine instance 142. For example, the deployment request can include an identification of an endpoint (e.g., an endpoint name, such as a hypertext transfer protocol (HTTP) endpoint name) and an identification of one or more trained machine learning models (e.g., a location of one or more model data files stored in the training model data store 175). Optionally, the deployment request also includes an identification of one or more container images stored in the container data store 170.

Upon receiving the deployment request, the model hosting system 140 initializes ones or more ML scoring containers 150 in one or more hosted virtual machine instance 142. In embodiments in which the deployment request includes an identification of one or more container images, the model hosting system 140 forms the ML scoring container(s) 150 from the identified container image(s). For example, a container image identified in a deployment request can be the same container image used to form an ML training container 130 used to train the machine learning model corresponding to the deployment request. Thus, the code 156 of the ML scoring container(s) 150 includes one or more executable instructions in the container image(s) that represent an algorithm that defines a machine learning model. In embodiments in which the deployment request does not include an identification of a container image, the model hosting system 140 forms the ML scoring container(s) 150 from one or more container images stored in the container data store 170 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 150 by retrieving model data corresponding to the identified trained machine learning model(s) in some embodiments. For example, the deployment request can identify a location of model data file(s) stored in the training model data store 175. In embodiments in which a single model data file is identified in the deployment request, the model hosting system 140 retrieves the identified model data file from the training model data store 175 and inserts the model data file into a single ML scoring container 150, which forms a portion of code 156. In some embodiments, the model data file is archived or compressed (e.g., formed from a package of individual files). Thus, the model hosting system 140 unarchives or decompresses the model data file to obtain multiple individual files, and inserts the individual files into the ML scoring container 150. In some embodiments, the model hosting system 140 stores the model data file in the same location as the location in which the model data file was stored in the ML training container 130 that generated the model data file. For example, the model data file initially was stored in the top container layer of the ML training container 130 at a certain offset, and the model hosting system 140 then stores the model data file in the top container layer of the ML scoring container 150 at the same offset.

In embodiments in which multiple model data files are identified in the deployment request, the model hosting system 140 retrieves the identified model data files from the training model data store 175. The model hosting system 140 can insert the model data files into the same ML scoring container 150, into different ML scoring containers 150 initialized in the same virtual machine instance 142, or into different ML scoring containers 150 initialized in different virtual machine instances 142. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 150 with the endpoint identified in the deployment request. For example, each of the initialized ML scoring container(s) 150 can be associated with a network address. The model hosting system 140 can map the network address(es) to the identified endpoint, and the model hosting system 140 or another system (e.g., a routing system, not shown) can store the mapping. Thus, a user device 102 can refer to trained machine learning model(s) stored in the ML scoring container(s) 150 using the endpoint. This allows for the network address of an ML scoring container 150 to change without causing the user operating the user device 102 to change the way in which the user refers to a trained machine learning model.

Once the ML scoring container(s) 150 are initialized, the ML scoring container(s) 150 are ready to execute trained machine learning model(s). In some embodiments, the user device 102 transmits an execution request to the model hosting system 140 via the frontend 149, where the execution request identifies an endpoint and includes an input to a machine learning model (e.g., a set of input data). The model hosting system 140 or another system (e.g., a routing system, not shown) can obtain the execution request, identifying the ML scoring container(s) 150 corresponding to the identified endpoint, and route the input to the identified ML scoring container(s) 150.

In some embodiments, a virtual machine instance 142 executes the code 156 stored in an identified ML scoring container 150 in response to the model hosting system 140 receiving the execution request. In particular, execution of the code 156 causes the executable instructions in the code 156 corresponding to the algorithm to read the model data file stored in the ML scoring container 150, use the input included in the execution request as an input parameter, and generate a corresponding output. As an illustrative example, the algorithm can include coefficients, weights, layers, cluster centroids, and/or the like. The executable instructions in the code 156 corresponding to the algorithm can read the model data file to determine values for the coefficients, weights, layers, cluster centroids, and/or the like. The executable instructions can include input parameters, and the input included in the execution request can be supplied by the virtual machine instance 142 as the input parameters. With the machine learning model characteristics and the input parameters provided, execution of the executable instructions by the virtual machine instance 142 can be completed, resulting in an output.

In some embodiments, the virtual machine instance 142 stores the output in the model prediction data store 180. Alternatively or in addition, the virtual machine instance 142 transmits the output to the user device 102 that submitted the execution result via the frontend 149.

In some embodiments, the execution request corresponds to a group of related trained machine learning models. Thus, the ML scoring container 150 can transmit the output to a second ML scoring container 150 initialized in the same virtual machine instance 142 or in a different virtual machine instance 142. The virtual machine instance 142 that initialized the second ML scoring container 150 can then execute second code 156 stored in the second ML scoring container 150, providing the received output as an input parameter to the executable instructions in the second code 156. The second ML scoring container 150 further includes a model data file stored therein, which is read by the executable instructions in the second code 156 to determine values for the characteristics defining the machine learning model. Execution of the second code 156 results in a second output. The virtual machine instance 142 that initialized the second ML scoring container 150 can then transmit the second output to the model prediction data store 180 and/or the user device 102 via the frontend 149 (e.g., if no more trained machine learning models are needed to generate an output) or transmit the second output to a third ML scoring container 150 initialized in the same or different virtual machine instance 142 (e.g., if outputs from one or more additional trained machine learning models are needed), and the above-referenced process can be repeated with respect to the third ML scoring container 150.

While the virtual machine instances 142 are shown in FIG. 1 as a single grouping of virtual machine instances 142, some embodiments of the present application separate virtual machine instances 142 that are actively assigned to execute tasks from those virtual machine instances 142 that are not actively assigned to execute tasks. For example, those virtual machine instances 142 actively assigned to execute tasks are grouped into an "active pool," while those virtual machine instances 142 not actively assigned to execute tasks are placed within a "warming pool." In some embodiments, those virtual machine instances 142 within the warming pool can be pre-initialized with an operating system, language runtimes, and/or other software required to enable rapid execution of tasks (e.g., rapid initialization of ML scoring container(s) 150, rapid execution of code 156 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 102, the model training system 120, etc.). The processing unit can also communicate to and from a memory of a virtual machine instance 142 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

Additional Embodiments of the Example Training and Hosting Environment

In some embodiments, the operating environment 100 supports many different types of machine learning models, such as multi arm bandit models, reinforcement learning models, ensemble machine learning models, deep learning models, and/or the like.

The model training system 120 and the model hosting system 140 depicted in FIG. 1 are not meant to be limiting. For example, the model training system 120 and/or the model hosting system 140 could also operate within a computing environment having a fewer or greater number of devices than are illustrated in FIG. 1. Thus, the depiction of the model training system 120 and/or the model hosting system 140 in FIG. 1 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 129 processes all training requests received from user devices 102 and provisions virtual machine instances 122. In some embodiments, the frontend 129 serves as a front door to all the other services provided by the model training system 120. The frontend 129 processes the requests and makes sure that the requests are properly authorized. For example, the frontend 129 may determine whether the user associated with the training request is authorized to initiate the training process.

Similarly, frontend 149 processes all deployment and execution requests received from user devices 102 and provisions virtual machine instances 142. In some embodiments, the frontend 149 serves as a front door to all the other services provided by the model hosting system 140. The frontend 149 processes the requests and makes sure that the requests are properly authorized. For example, the frontend 149 may determine whether the user associated with a deployment request or an execution request is authorized to access the indicated model data and/or to execute the indicated machine learning model.

The training data store 160 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 160 is depicted as being located external to the model training system 120 and the model hosting system 140, this is not meant to be limiting. For example, in some embodiments not shown, the training data store 160 is located internal to at least one of the model training system 120 or the model hosting system 140.

In some embodiments, the training metrics data store 165 stores model metrics. While the training metrics data store 165 is depicted as being located external to the model training system 120 and the model hosting system 140, this is not meant to be limiting. For example, in some embodiments not shown, the training metrics data store 165 is located internal to at least one of the model training system 120 or the model hosting system 140.

The container data store 170 stores container images, such as container images used to form ML training containers 130 and/or ML scoring containers 150, that can be retrieved by various virtual machine instances 122 and/or 142. While the container data store 170 is depicted as being located external to the model training system 120 and the model hosting system 140, this is not meant to be limiting. For example, in some embodiments not shown, the container data store 170 is located internal to at least one of the model training system 120 and the model hosting system 140.

The training model data store 175 stores model data files. In some embodiments, some of the model data files are comprised of a single file, while other model data files are packages of multiple individual files. While the training model data store 175 is depicted as being located external to the model training system 120 and the model hosting system 140, this is not meant to be limiting. For example, in some embodiments not shown, the training model data store 175 is located internal to at least one of the model training system 120 or the model hosting system 140.

The model prediction data store 180 stores outputs (e.g., execution results) generated by the ML scoring containers 150 in some embodiments. While the model prediction data store 180 is depicted as being located external to the model training system 120 and the model hosting system 140, this is not meant to be limiting. For example, in some embodiments not shown, the model prediction data store 180 is located internal to at least one of the model training system 120 and the model hosting system 140.

While the model training system 120, the model hosting system 140, the training data store 160, the training metrics data store 165, the container data store 170, the training model data store 175, and the model prediction data store 180 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 102 via the network 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 102 with one or more user interfaces, command-line interfaces (CLI), application programming interfaces (API), and/or other programmatic interfaces for submitting training requests, deployment requests, and/or execution requests. In some embodiments, the user devices 102 can execute a stand-alone application that interacts with the model training system 120 and/or the model hosting system 140 for submitting training requests, deployment requests, and/or execution requests.

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagram for Training a Machine Learning Model

Figure 2:
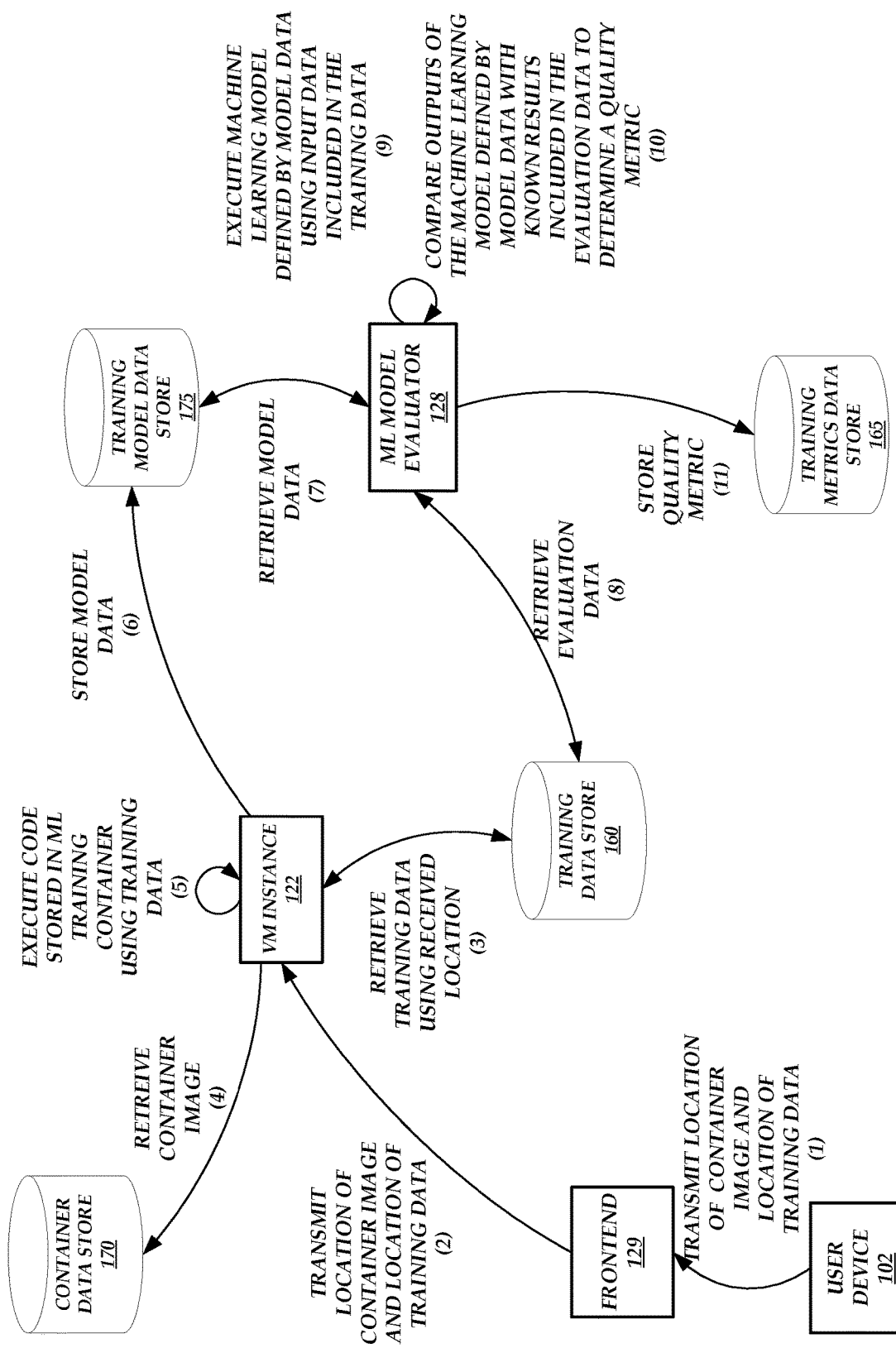
FIG. 2 is a block diagram of the operating environment of FIG. 1 illustrating the operations performed by the components of the operating environment to train a machine learning model, according to some embodiments.

FIG. 2 is a block diagram of the operating environment 100 of FIG. 1 illustrating the operations performed by the components of the operating environment 100 to train a machine learning model, according to some embodiments. As illustrated in FIG. 2, the user device 102 transmits a location of a container image and a location of training data to the frontend 129 at (1). The frontend 129 then causes a virtual machine instance 122 to be initialized and forwards the container image location and the training data location to the initialized virtual machine instance 122 at (2). In some embodiments, the container image location and the training data location are transmitted as part of a training request.

In some embodiments, the virtual machine instance 122 retrieves training data from the training data store 160 using the received location at (3). Before, during, or after retrieving the training data, the virtual machine instance 122 retrieves the container image from the container data store 170 using the received location at (4).

The virtual machine instance 122 initializes an ML training container within the virtual machine instance 122 using the received container image in some embodiments. The virtual machine instance 122 then executes code stored in the ML training container using the retrieved training data at (5) to train a machine learning model. For example, the code can include executable instructions originating in the container image that represent an algorithm that defines a machine learning model that is yet to be trained. The virtual machine instance 122 executes the code according to hyperparameter values that are provided by the user device 102.

Executing the executable instructions causes the ML training container to generate model data that includes characteristics of the machine learning model being trained. The virtual machine instance 122 stores the model data in the training model data store 175 at (6) in some embodiments. In some embodiments, the virtual machine instance 122 generates multiple model data files that are packaged into a single file stored in the training model data store 175.

During the machine learning model training process, the ML model evaluator 128 can retrieve the model data from the training model data store 175 at (7). The ML model evaluator 128 further retrieves evaluation data from the training data store 160 at (8). For example, the evaluation data can be data that is separate from the data used to train machine learning models. The evaluation data can include input data and known results that occurred or were formed as a result of the input data. In some embodiments, the ML model evaluator 128 executes a machine learning model defined by the retrieved model data using input data included in the evaluation data at (9). The ML model evaluator 128 then compares outputs of the machine learning model defined by the retrieved model data with known results included in the evaluation data to determine a quality metric of the machine learning model at (10). For example, the quality metric can be determined based on an aggregated difference (e.g., average difference, median difference, etc.) between the machine learning model outputs and the known results. The ML model evaluator 128 can then store the quality metric in the training metrics data store 165 at (11).

In some embodiments, the ML model evaluator 128 also stores additional information in the training metrics data store 165. For example, the ML model evaluator 128 can store the input data (or tags that represent the input data), the machine learning model outputs, and the known results. Thus, a user, via the user device 102, can not only identifying the quality metric(s), but can also identify which inputs resulted in small or no differences between machine learning model outputs and known results, which inputs resulted in large differences between machine learning model outputs and known results, etc.

Example Block Diagram for Modifying Machine Learning Model Training

Figure 3:
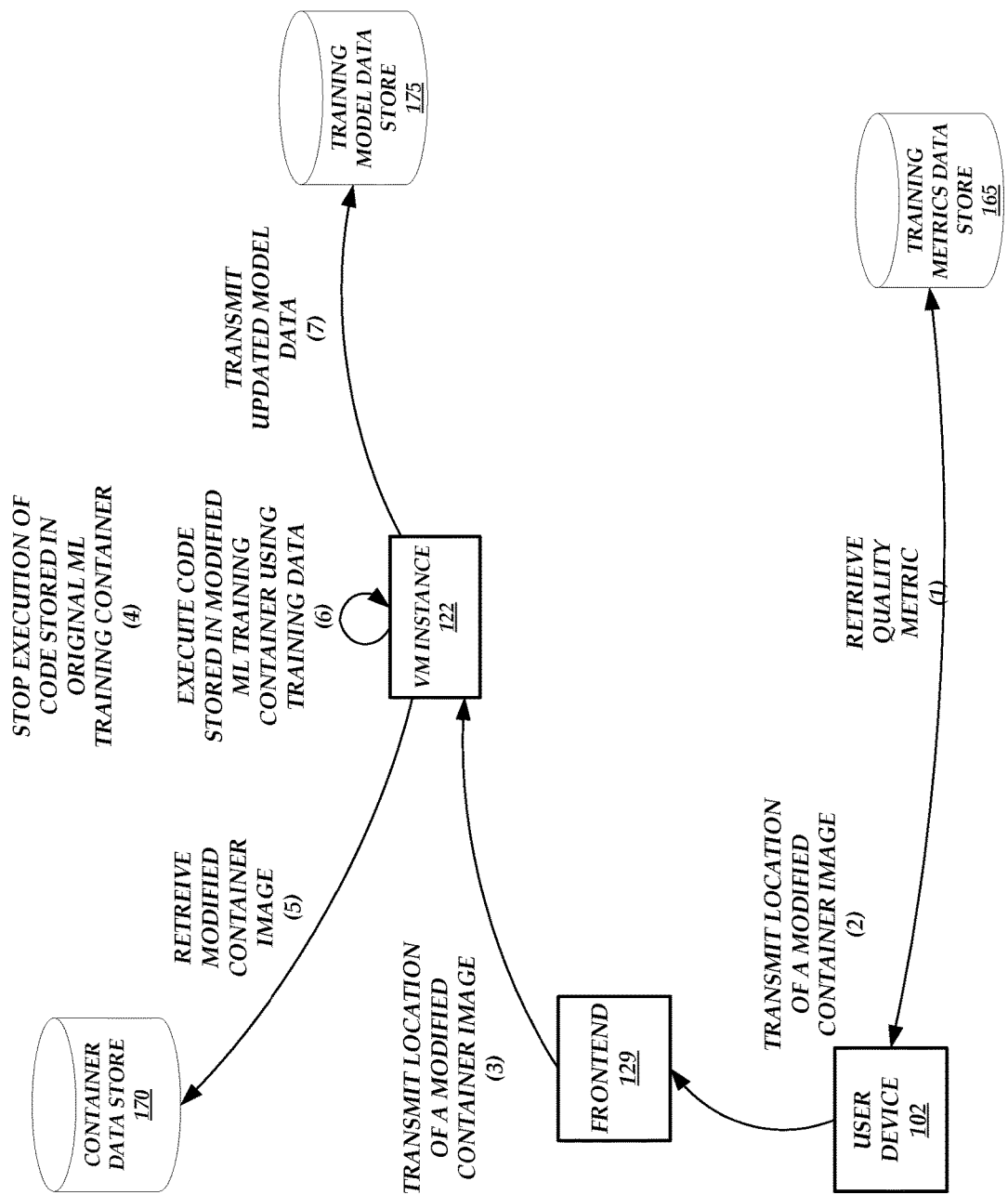
FIG. 3 is a block diagram of the operating environment of FIG. 1 illustrating the operations performed by the components of the operating environment to modify machine learning model training, according to some embodiments.

FIG. 3 is a block diagram of the operating environment 100 of FIG. 1 illustrating the operations performed by the components of the operating environment 100 to modifying machine learning model training, according to some embodiments. As illustrated in FIG. 3, the user device 102 retrieves a quality metric stored in the training metrics data store 165 at (1). In some embodiments, a user, via the user device 102, retrieves the quality etric to determine the accuracy of a machine learning model still being trained.

In some embodiments, the user device 102 transmits a location of a modified container image to the frontend 129 at (2). The frontend 129 then forwards the location of modified container image to the virtual machine instance 122 at (3). The user device 102 can transmit the modified container image as part of a modification request to modify the machine learning model being trained. In response, the virtual machine instance 122 stops execution of the code stored in the original ML training container formed from the original container image at (4). The virtual machine instance 122 then retrieves the modified container image from the container data store 170 at (5) using the received location. The virtual machine instance 122 can then form a modified ML training container from the modified container image, and execute code stored in the modified ML training container using previously retrieved training data at (6) to re-train a machine learning model.

Execution of the code causes the modified ML training container to generate updated model data, which the virtual machine instance 122 then stores in the training model data store 175 at (7). In some embodiments, not shown, the virtual machine instance 122 causes the training model data store 175 to delete any model data stored as a result of training performed using the original ML training container.

In some embodiments, not shown, while the user desires to modify a machine learning model being trained, the user, via the user device 102, does not provide a location of a modified container image because the user does not want to initialize a new ML training container. Rather, the user desires to modify the existing ML training container at runtime so that the machine learning model can be modified without re-starting the training process. Thus, the user device 102 instead provides code that the virtual machine instance 122 adds to the existing ML training container (or uses to replace other code already existing in the ML training container). For example, the original container image used to form the existing ML training container can include executable instructions that are constructed such that the executable instructions retrieve and execute additional code when executed. Such additional code can be provided by the user device 102 in conjunction with the container image (e.g., when the ML training container is initialized) and/or after the virtual machine instance 122 has already begun to execute code stored within the ML training container. In this embodiment, the container image, together with the additional code, form a complete ML training container.

Example Block Diagram for Parallelized Machine Learning Model Training

Figure 4:
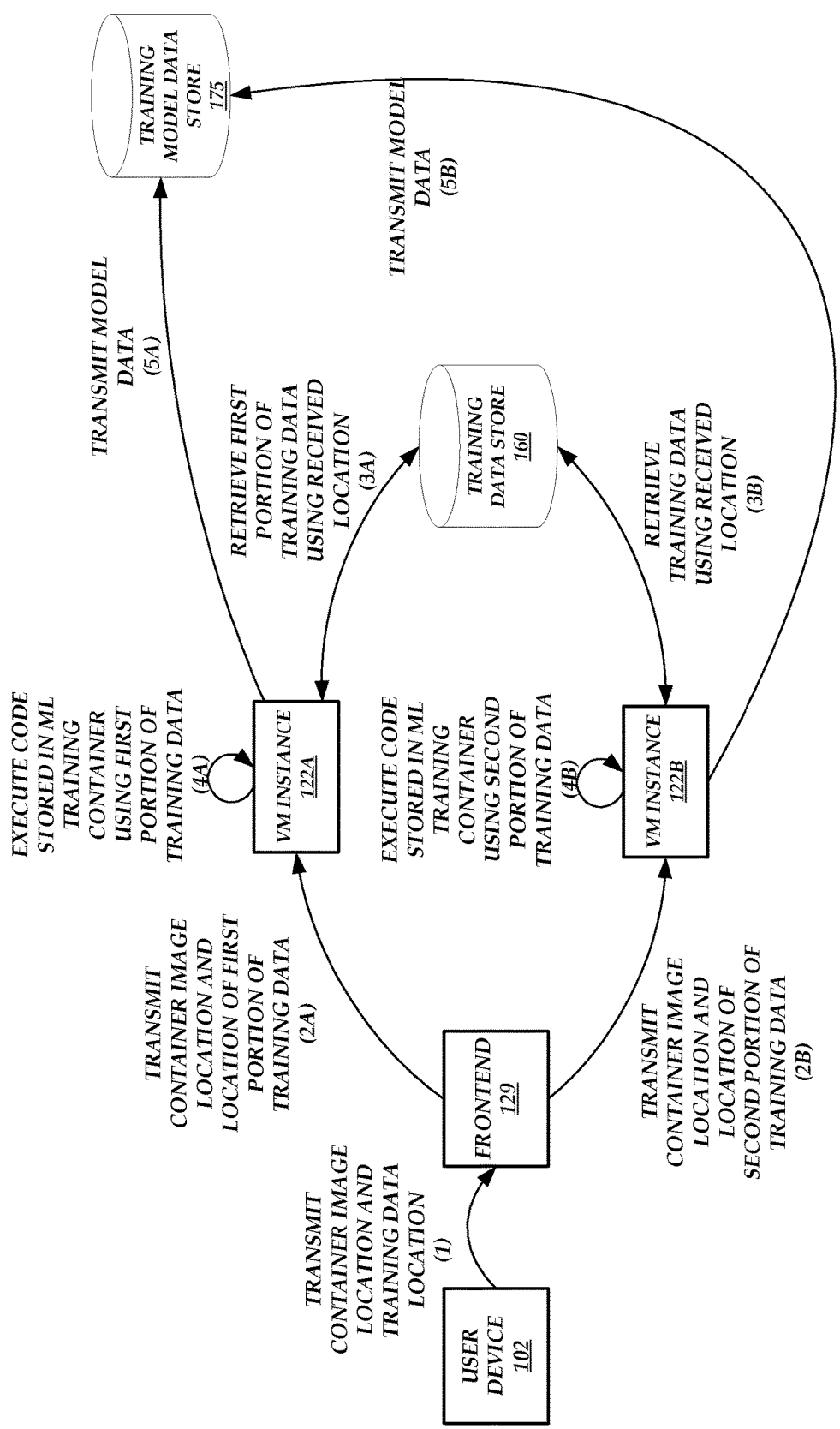
FIG. 4 is a block diagram of the operating environment of FIG. 1 illustrating the operations performed by the components of the operating environment to parallelize the machine learning model training process, according to some embodiments.

FIG. 4 is a block diagram of the operating environment 100 of FIG. 1 illustrating the operations performed by the components of the operating environment 100 to parallelize the machine learning model training process, according to some embodiments. As illustrated in FIG. 4, user device 102 transmits a container image location and a training data location to the frontend 129 at (1). In response, the frontend 129 initializes a first virtual machine instance 122A and a second virtual machine instance 122B such that the first virtual machine instance 122A can perform a partial training of a machine learning model using a first portion of the training data and the second virtual machine instance 122B can perform a partial training of the machine learning model using a second portion of the training data. The frontend 129 then transmits the container image location and the location of a first portion of the training data to the virtual machine instance 122A at (2A). Before, during, or after transmitting the container image location and the location of the first portion of the training data to the virtual machine instance 122A, the frontend 129 transmits the container image location and the location of a second portion of the training data to the virtual machine instance 122B at (2B). In some embodiments, the container image location and the training data location are transmitted as part of training requests.

In some embodiments, the virtual machine instance 122A retrieves the first portion of the training data from the training data store 160 using the received location at (3A). Before, during, or after the virtual machine instance 122A retrieves the first portion of the training data, the virtual machine instance 122B retrieves the second portion of the training data from the training data store 160 using the received location at (3B). In some embodiments, not shown, the virtual machine instances 122A-122B retrieve the same training data.

The virtual machine instance 122A then forms an ML training container using a container image retrieved from the indicated location in some embodiments, and executes code stored in the ML training container using the retrieved first portion of the training data at (4A). Before, during, or after the virtual machine instance 122A executes the code, the virtual machine instance 122B forms an ML training container using a container image retrieved from the indicated location and executes code stored in the ML training container using the retrieved second portion of the training data at (4B). Thus, the virtual machine instances 122A-122B each include a copy of the same ML training container.

Executing the code causes the virtual machine instances 122A-122B (e.g., the ML training containers included therein) to generate model data. Thus, the virtual machine instance 122A transmits model data to the training model data store 175 at (5A) and the virtual machine instance 122B transmits model data to the training model data store 175 at (5B). In some embodiments, not shown, the model data generated by each virtual machine instance 122A-122B is packaged into a single model data file (e.g., by the training model data store 175).

In some embodiments, the virtual machine instances 122A-122B communicate with each other during the machine learning model training. For example, the virtual machine instances 122A-122B can share coefficients, weights, training strategies, and/or the like during the training process.

Example Block Diagram for Deploying and Executing a Machine Learning Model

Figure 5A:
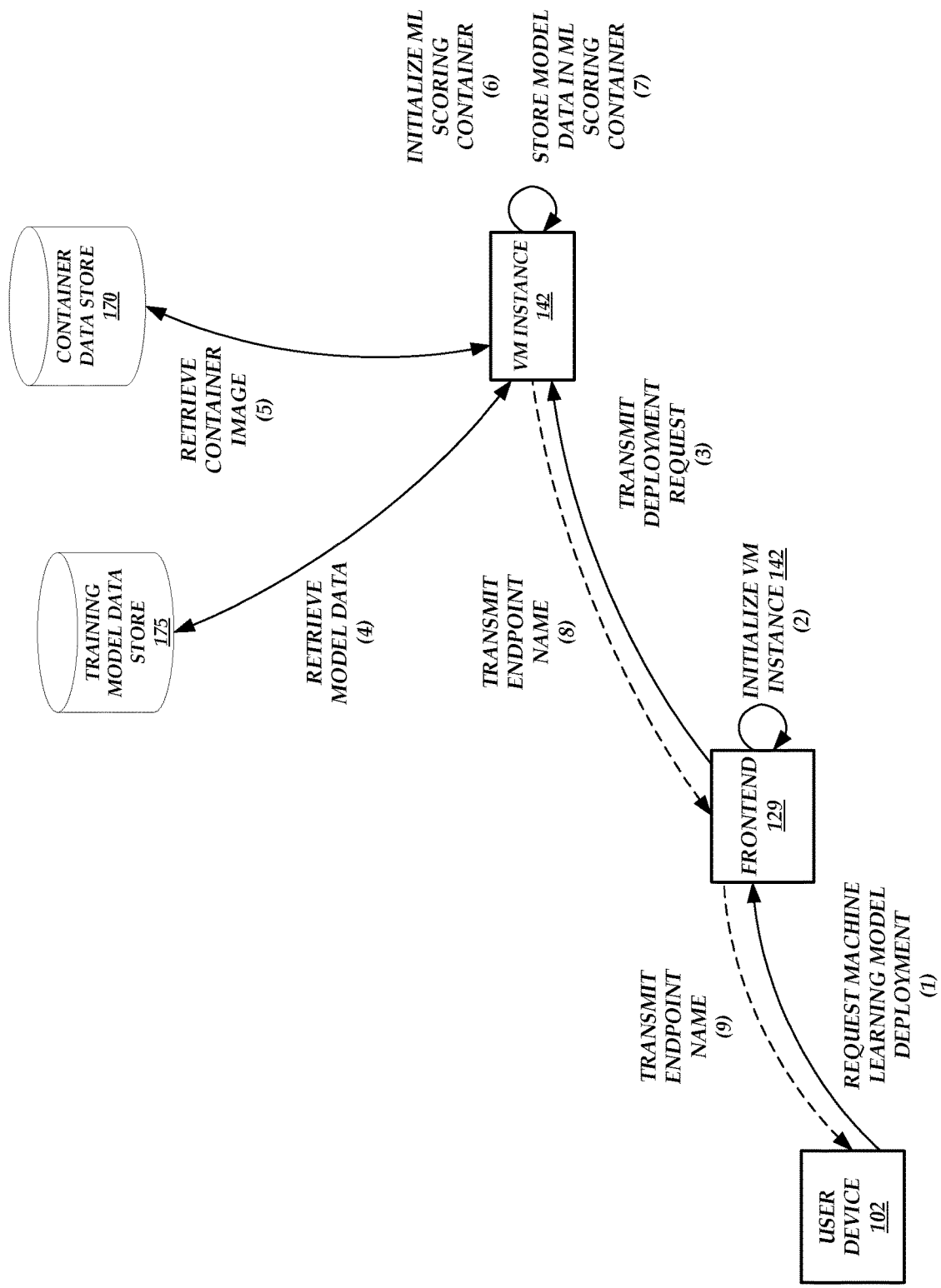
FIG. 5A is a block diagram of the operating environment of FIG. 1 illustrating the operations performed by the components of the operating environment to deploy a trained machine learning model, according to some embodiments.

FIG. 5A is a block diagram of the operating environment 100 of FIG. 1 illustrating the operations performed by the components of the operating environment 100 to deploy a trained machine learning model, according to some embodiments. As illustrated in FIG. 5A, user device 102 transmits a machine learning model deployment request to the frontend 149 at (1). The frontend 149 can initialize a virtual machine instance 142 at (2) and transmit the deployment request to the virtual machine instance 142 at (3). The deployment request includes a location of one or more model data files stored in the training model data store 175. In some embodiments, the deployment request includes an endpoint name. In some embodiments, the deployment request does not include an endpoint name.

In some embodiments, the virtual machine instance 142 retrieves model data from the training model data store 175 at (4). For example, the virtual machine instance 142 retrieves the model data corresponding to the location identified in the deployment request. In some embodiments, not shown, the virtual machine instance 142 does not retrieve the model data. Rather, the model data can be embedded in the container image retrieved by the virtual machine instance 142. The virtual machine instance 142 also retrieves a container image from the container data store 170 at (5). The container image can correspond to a container image identified in the deployment request.

The virtual machine instance 142 can initialize an ML scoring container at (6) in some embodiments. For example, the virtual machine instance 142 can form the ML scoring container using the retrieved container image. The virtual machine instance 142 can further store the model data in the ML scoring container (e.g., in a location that is the same as the location in which the model data is stored in an ML training container 130 when a machine learning model is trained) at (7).

In some embodiments, if the deployment request did not include an endpoint name, the virtual machine instance 142 can transmit an endpoint name to the frontend 149 at (8). The frontend 149 can then forward the endpoint name to the user device 102 at (9). Thus, the user device 102 can use the endpoint name to access the initialized ML scoring container in the future (e.g., to submit a machine learning model execution request).

Figure 5B:
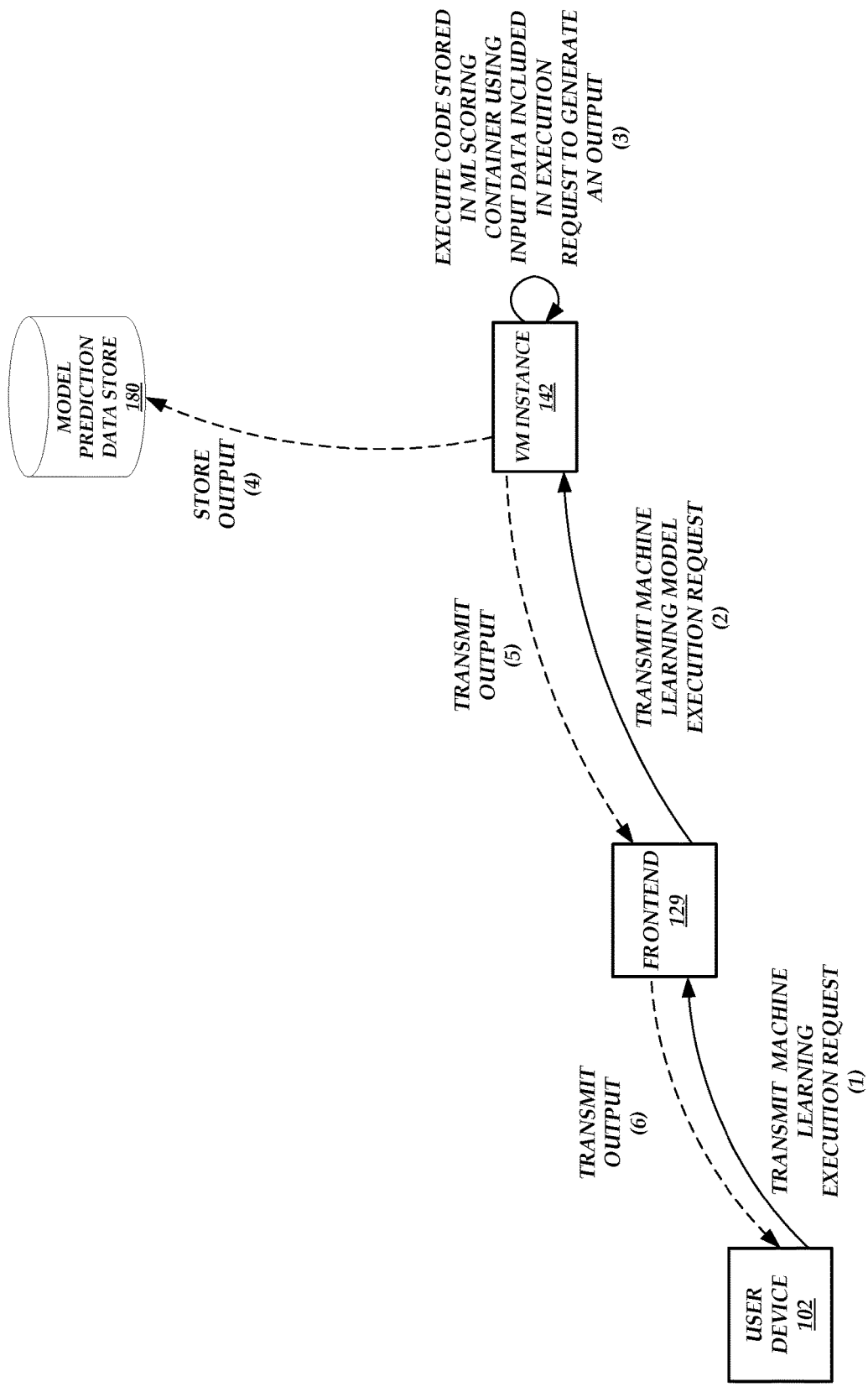
FIG. 5B is a block diagram of the operating environment of FIG. 1 illustrating the operations performed by the components of the operating environment to execute a trained machine learning model, according to some embodiments.

FIG. 5B is a block diagram of the operating environment 100 of FIG. 1 illustrating the operations performed by the components of the operating environment 100 to execute a trained machine learning model, according to some embodiments. As illustrated in FIG. 5B, user device 102 transmits a machine learning model execution request to the frontend 149 at (1). The frontend 149 then forwards the execution request to the virtual machine instance 142 at (2). In some embodiments, the execution request includes an endpoint name, which the model hosting system 140 uses to route the execution request to the appropriate virtual machine instance 142.

In some embodiments, the virtual machine instance 142 executes code stored in an ML scoring container initialized in the virtual machine instance 142 using input data included in the execution request to generate an output at (3). In some embodiments, the virtual machine instance 142 stores the output in the model prediction data store 180 at (4). Alternatively or in addition, the virtual machine instance 142 transmits the output to the frontend 149 at (5), and the frontend 149 transmits the output to the user device 102 at (6).

Example Block Diagram for Executing Related Machine Learning Models

Figure 6:
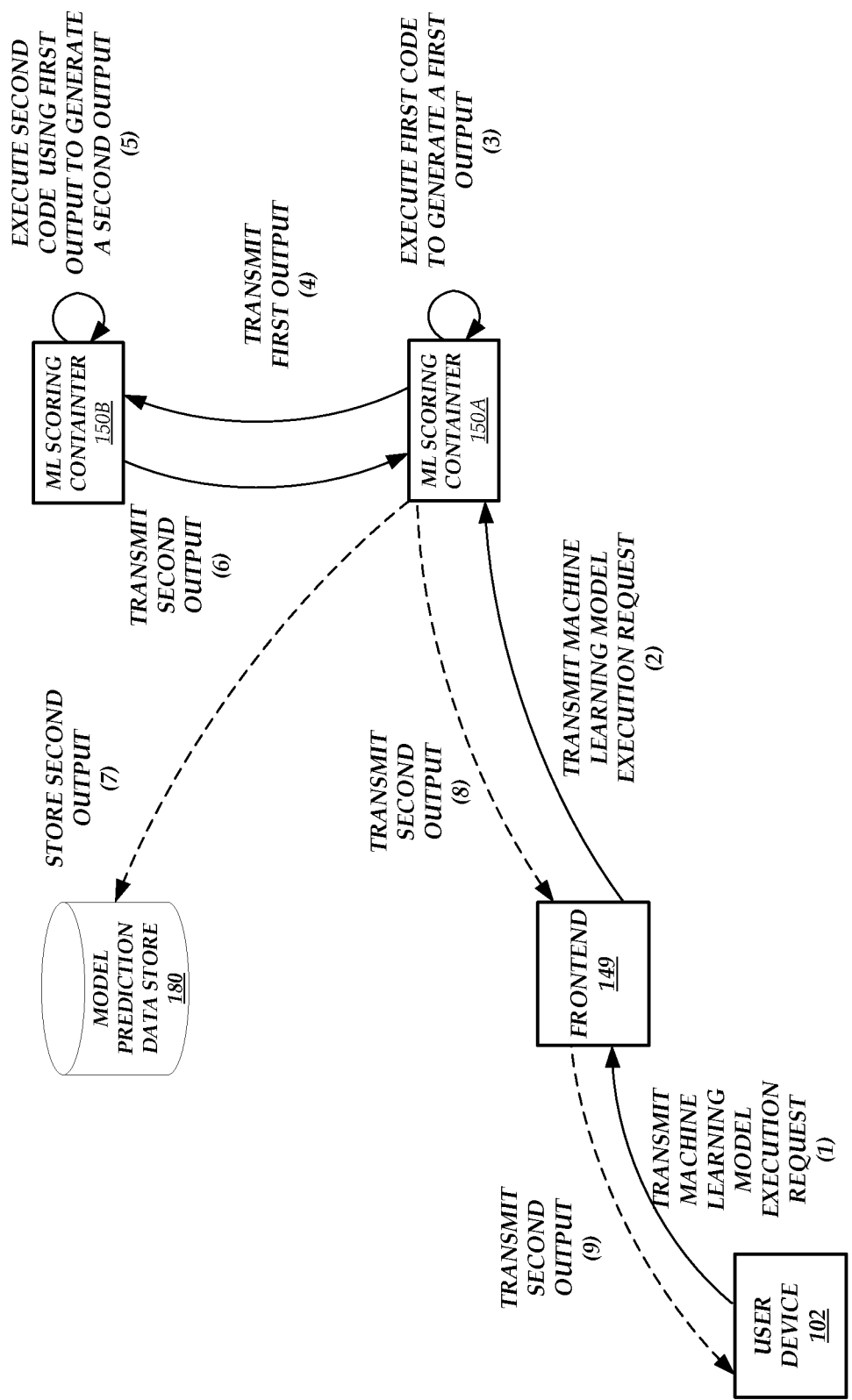
FIG. 6 is a block diagram of the operating environment of FIG. 1 illustrating the operations performed by the components of the operating environment to execute related machine learning models, according to some embodiments.

FIG. 6 is a block diagram of the operating environment 100 of FIG. 1 illustrating the operations performed by the components of the operating environment 100 to execute related machine learning models, according to some embodiments. As illustrated in FIG. 6, user device 102 transmits a machine learning model execution request to the frontend 149 at (1). The frontend 149 then forwards the execution request to a first ML scoring container 150A initialized in a virtual machine instance 142 at (2). In some embodiments, the execution request can include a request for an output from a second machine learning model executed by a second ML scoring container 150B initialized in the virtual machine instance 142. However, to generate an output, the ML scoring container 150B needs data from the execution of a first machine learning model executed by the ML scoring container 150A. Thus, the virtual machine instance 142 initially routes the execution request to the ML scoring container 150A. In some embodiments, the ML scoring container 150A servers as a master container, managing communications to and from other ML scoring containers (e.g., ML scoring container 150B).

In some embodiments, virtual machine instance 142 causes the ML scoring container 150A to execute first code to generate a first output at (3). For example, execution of the first code represents the execution of a first machine learning model using input data included in the execution request. The ML scoring container 150A then transmits the first output to the ML scoring container 150B at (4).

The virtual machine instance 142 then causes the second ML scoring container 150B to execute second code using the first output to generate a second output at (5). For example, execution of the second code represents the execution of a second machine learning model using the first output as an input to the second machine learning model. The second ML scoring container 150B then transmits the second output to the first ML scoring container 150A at (6).

In some embodiments, the virtual machine instance 142 pulls the second output from the first ML scoring container 150A and stores the second output in the model prediction data store 180 at (7). Alternatively or in addition, the virtual machine instance 142 pulls the second output from the first ML scoring container 150A and transmits the second output to the frontend 149 at (8). The frontend 149 then transmits the second output to the user device 102 at (9).

In some embodiments, not shown, the ML scoring containers 150A-150B are initialized in different virtual machine instances 142. Thus, the transmissions of the first output and the second output can occur between virtual machine instances 142.

Example Machine Learning Model Accuracy Improvement Routine

Figure 7:
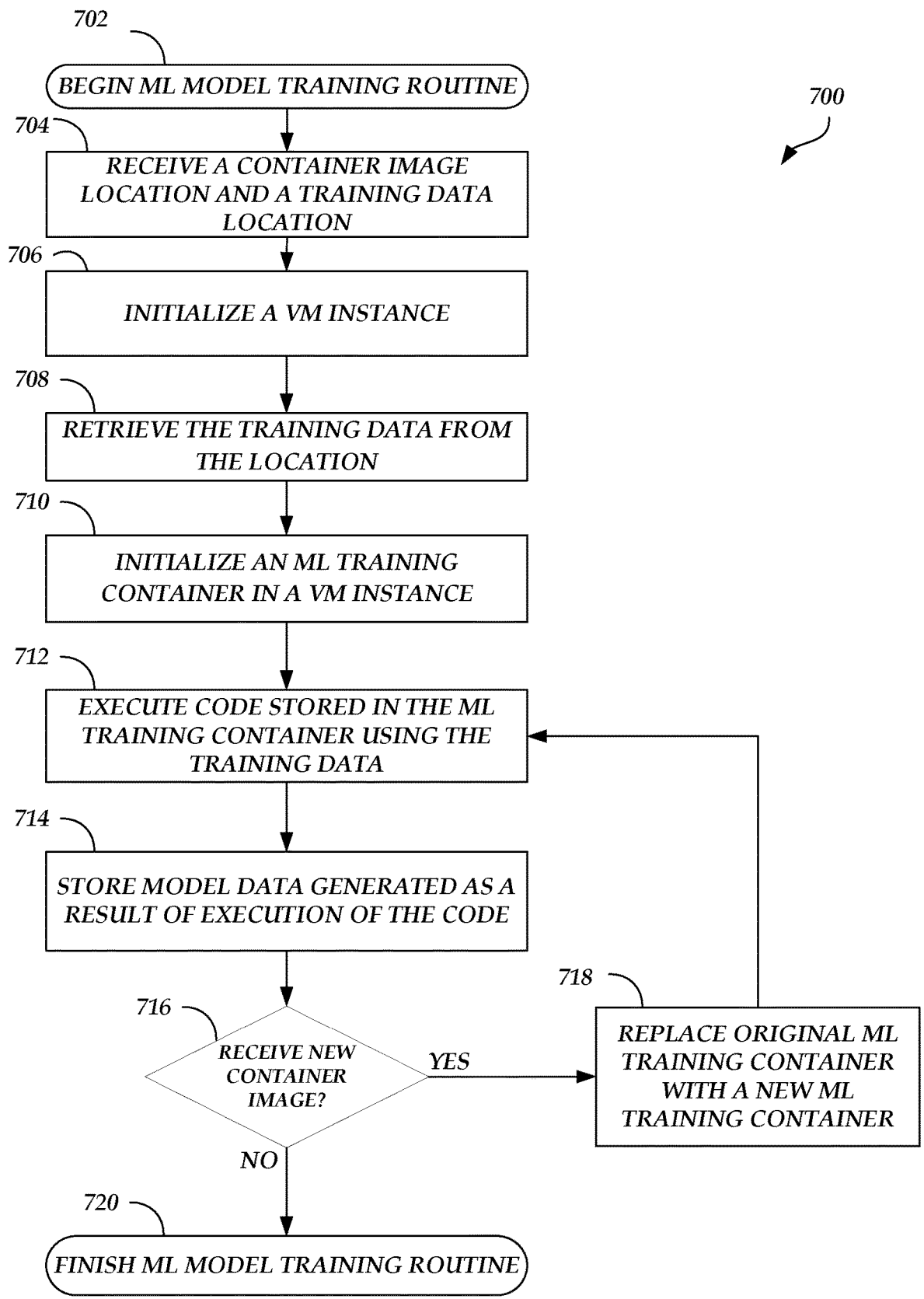
FIG. 7 is a flow diagram depicting a machine learning model training routine illustratively implemented by a model training system, according to some embodiments.

FIG. 7 is a flow diagram depicting a machine learning model training routine 700 illustratively implemented by a model training system, according to some embodiments. As an example, the model training system 120 of FIG. 1 can be configured to execute the machine learning model training routine 700. The machine learning model training routine 700 begins at block 702.

At block 704, in some embodiments, a container image location and a training data location are received. For example, the container image location and the training data location are received as part of a training request.

At block 706, in some embodiments, a virtual machine instance is initialized. For example, the initialized virtual machine instance is the instance that will perform the machine learning model training.

At block 708, in some embodiments, the container image and training data are retrieved. For example, the container image can be retrieved from the container data store 170 and the training data can be retrieved from the training data store 160.

At block 710, in some embodiments, an ML training container is initialized in the virtual machine instance. For example, the ML training container is formed using the received container image. The container image includes executable instructions that define an algorithm. Thus, the ML training container includes code that includes executable instructions that define an algorithm.

At block 712, in some embodiments, code stored in the ML training container is executed using the retrieved training data. For example, the retrieved training data (e.g., input data in the training data) is supplied as inputs to the executable instructions that define the algorithm (e.g., using as values for input parameters of the executable instructions).

At block 714, in some embodiments, model data generated as a result of execution of the code is stored. For example, the model data is stored in the training model data store 175. Model data can be periodically generated during the machine learning model training process.

At block 716, in some embodiments, a determination is made as to whether a new container image is received during the machine learning model training process. If a new container image is received, the machine learning model training routine 700 proceeds to block 718. Otherwise, if no new container image is received during the machine learning model training process, the machine learning model training routine 700 proceeds to block 720 and ends.

At block 718, in some embodiments, the original ML training container is replaced with a new ML training container. For example, the new ML training container is formed using the new container image. Once the original ML training container is replaced, the machine learning model training routine 700 proceeds back to block 712 such that code stored in the new ML training container is executed using the training data.

In some embodiments, not shown, a new container image is not received. However, a new hyperparameter (e.g., a change to the number of clusters, a change to the number of layers, etc.), new code, and/or the like is received. The model training system 120 can modify the original ML training container during runtime (instead of replacing the original ML training container with a new ML training container) to train the machine learning model using the new hyperparameter, using the new code, and/or the like.

Example Architecture of Model Training and Hosting Systems

Figure 8:
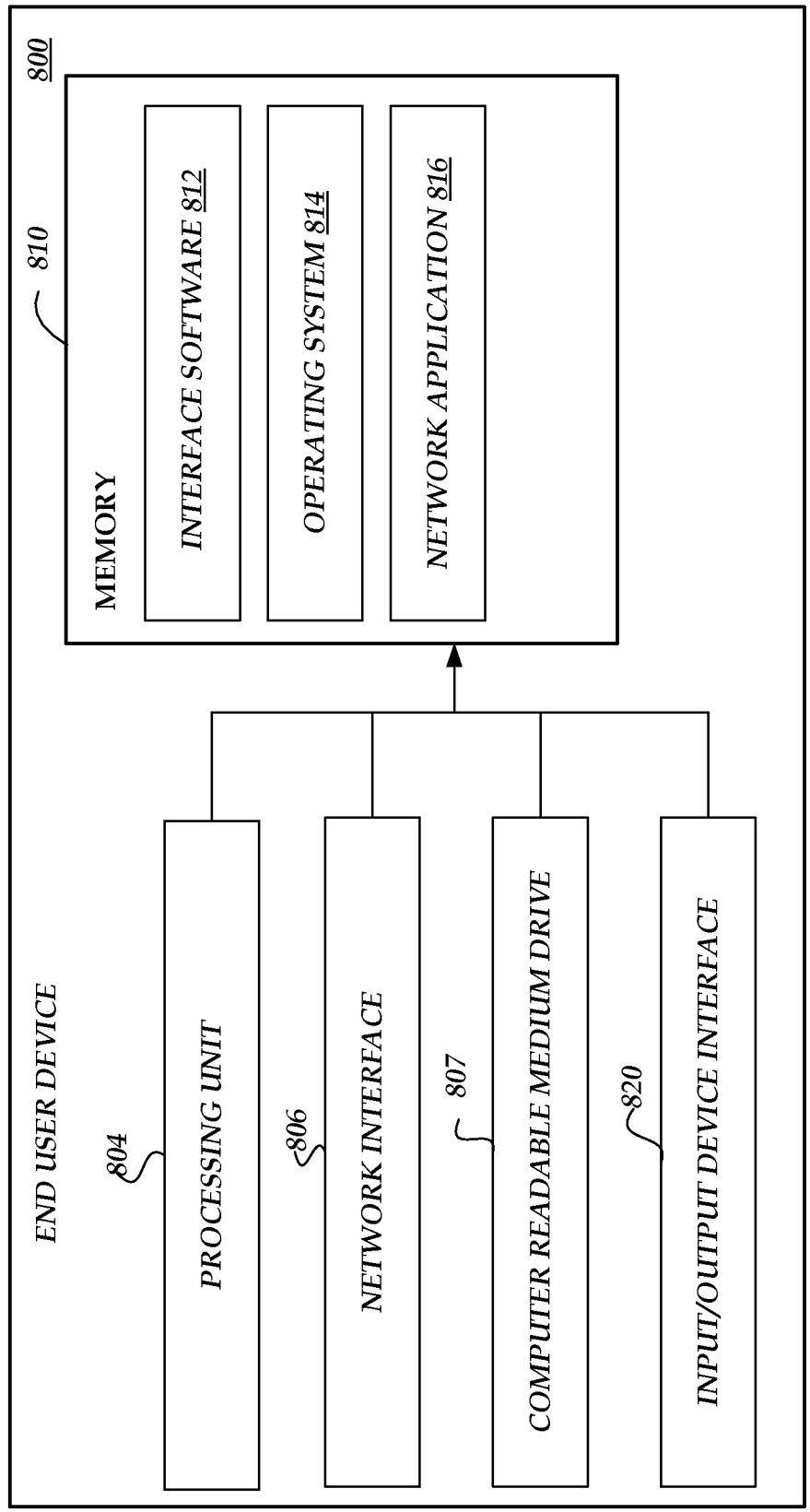
FIG. 8 depicts some embodiments of an architecture of an illustrative model system, such as the model training system and the model hosting system, that train and/or host machine learning models in accordance with the present application.

FIG. 8 depicts some embodiments of an architecture of an illustrative model system 800, such as the model training system 120 and the model hosting system 140, that train and/or host machine learning models in accordance with the present application. The general architecture of the model system depicted in FIG. 8 includes an arrangement of computer hardware and software components that can be used to implement aspects of the present disclosure. As illustrated, the model system 800 includes a processing unit 804, a network interface 806, a computer-readable medium drive 807, an input/output device interface 820, all of which may communicate with one another by way of a communication bus.

In some embodiments, the network interface 806 provides connectivity to one or more networks or computing systems, such as the network 110 of FIG. 1. The processing unit 804 can thus receive information and instructions from other computing systems or services via a network. The processing unit 804 can also communicate to and from memory 810 and further provide output information. In some embodiments, the model system 800 includes more (or fewer) components than those shown in FIG. 8.

In some embodiments, the memory 810 includes computer program instructions that the processing unit 804 executes in order to implement one or more embodiments. The memory 810 generally includes RAM, ROM, or other persistent or non-transitory memory. The memory 810 can store an operating system 814 that provides computer program instructions for use by the processing unit 804 in the general administration and operation of the functionality implemented by the model training system 120 and/or the model hosting system 140. The memory 810 can further include computer program instructions and other information for implementing aspects of the present disclosure. For example, in some embodiments, the memory 810 includes a model training component 816 that corresponds to functionality provided by the model training system 120 illustrated in FIG. 1. In some embodiments, the memory 810 includes a model execution component 818 that corresponds to functionality provided by the model hosting system 140.

Example Architecture of an End User Device

Figure 9:
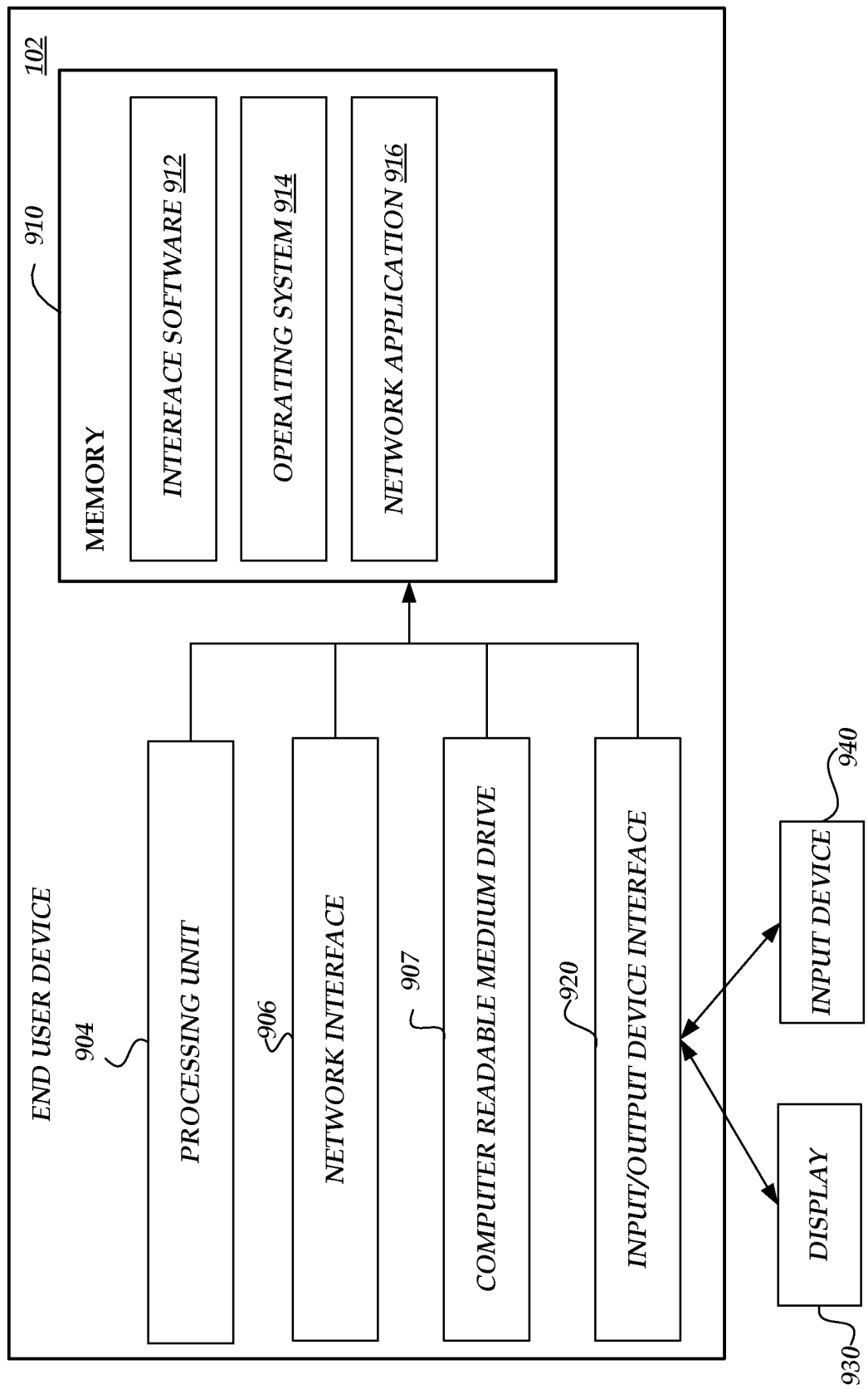
FIG. 9 depicts some embodiments of an architecture of an illustrative end user device that can receive data, prepare data, transmit training requests to the model training system, and transmit deployment and/or execution requests to the model hosting system in accordance with the present application.

FIG. 9 depicts some embodiments of an architecture of an illustrative end user device 102 that can receive data, prepare data, transmit training requests to the model training system 120, and transmit deployment and/or execution requests to the model hosting system 140 in accordance with the present application. The general architecture of the end user device 102 depicted in FIG. 9 includes an arrangement of computer hardware and software components that can be used to implement and access aspects of the present disclosure. As illustrated, the end user device 102 includes a processing unit 904, a network interface 906, a computer readable medium drive 907, an input/output device interface 920, an optional display 930, and an input device 940, all of which may communicate with one another by way of a communication bus.

In some embodiments, the network interface 906 provides connectivity to one or more networks or computing systems, such as the network 110 of FIG. 1. The processing unit 904 can thus receive information and instructions from other computing systems or services via a network. The processing unit 904 can also communicate to and from memory 910 and further provide output information for the optional display 930 via the input/output device interface 920. The input/output device interface 920 can also accept input from the optional input device 940, such as a keyboard, mouse, digital pen, touchscreen, etc. In some embodiments, the end user devices 102 include more (or fewer) components than those shown in FIG. 9.

In some embodiments, the memory 910 includes computer program instructions that the processing unit 904 executes in order to receive data, prepare data, and transmit the requests described herein. The memory 910 generally includes RAM, ROM, or other persistent or non-transitory memory. The memory 910 can store an operating system 914 that provides computer program instructions and interface software 912 for use by the processing unit 904 in the general administration and operation of the end user device 102. The memory 910 can further include computer program instructions and other information for implementing aspects of the present disclosure. For example, in some embodiments, the memory 910 includes a network application 916, such as browser application, media player, CLI, stand-alone application, etc., for accessing content and communicating with the model training system 120 and/or the model hosting system 140.

Cloud-Based Machine Learning Job as a Part of an Interactive Environment

While one can run machine learning jobs such as training and/or inference on an edge device, performing machine learning jobs is resource and/or time intensive and many edge devices are less than optimal locations for this effort. Detailed herein are embodiments directed to allowing a user to use an interactive programming environment to control a machine learning algorithm (MLA) job that is executing on remote hardware such as at a web services provider. This allows a user to take advantage of hardware that is not directly available locally or, even if the hardware is locally available, to not take over these resources. Using embodiments detailed herein, the interactive programming environment allows a user to feel as if the job is being executed locally (for example, output of the training and/or inference is provided to the interactive programming environment, and/or output from the remote execution is stored locally, etc.).

Figure 10:
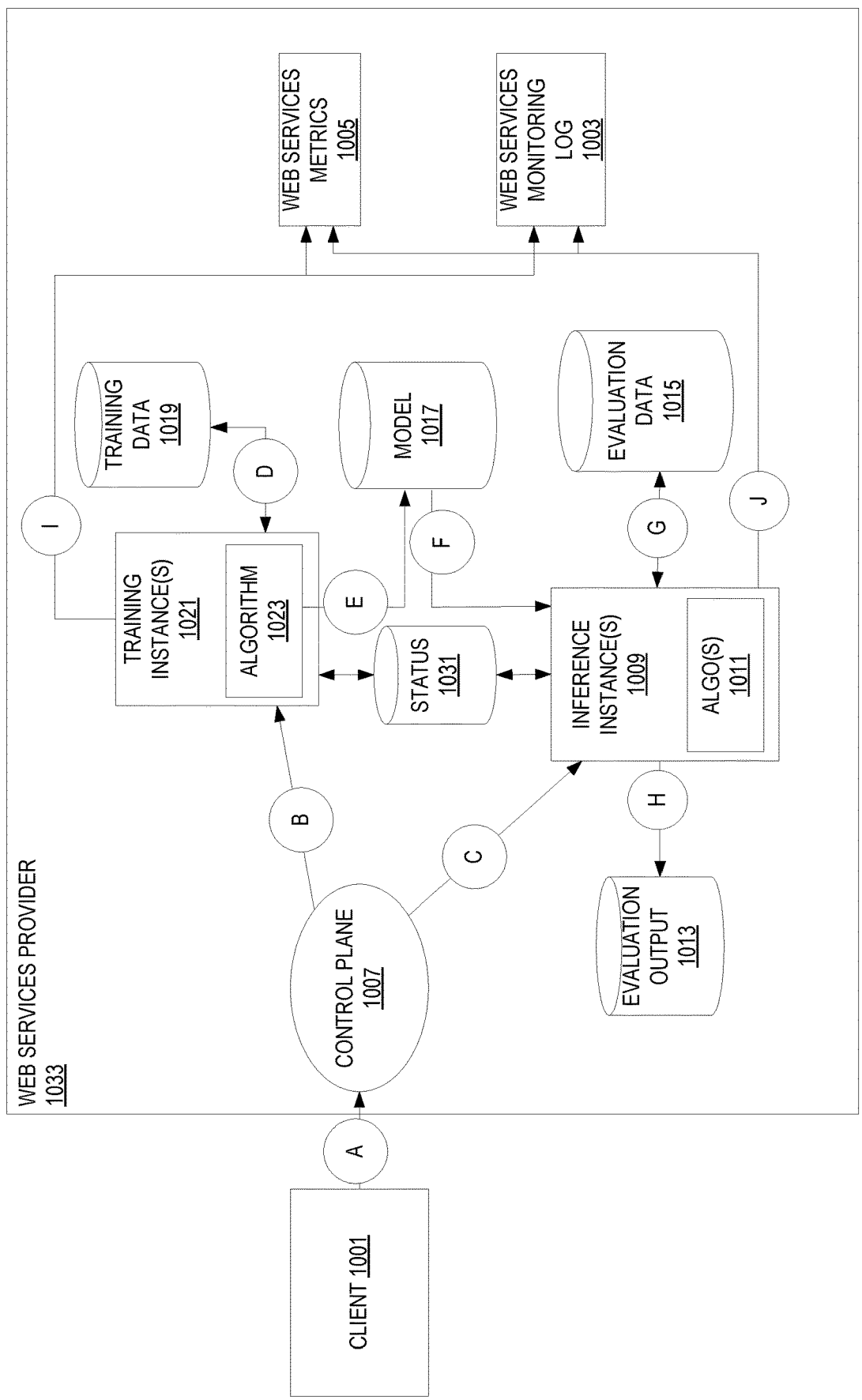
FIG. 10 illustrates embodiments of a system for supporting a remote-based machine learning algorithm (MLA) job that is a part of an interactive programming environment (such as an interactive programming application).

FIG. 10 illustrates embodiments of a system for supporting a remote-based machine learning algorithm (MLA) job that is a part of an interactive programming environment (such as an interactive programming application). In some embodiments, the systems detailed above for machine learning model training and hosting allow for remote jobs to appear to be a part of an interactive programming environment (such as interactive programming application executing on an edge/end user device such as devices 102).

A client (such an interactive programming application) 1001 supports one or more programming languages and provides an interactive output for MLA jobs written in the one or more programming languages. For example, hypertext markup language (HTML) content, images, etc. may be output showing the user how a remote job is running (such as error rate, resources consumed, etc.). The interactive programming application 1001 provides text output and charts (e.g., error rate for a model execution) in some embodiments. The interactive programming application 1001 is coupled to a control plane 1007 of a web services (cloud) provider 1033. In some embodiments, the interactive programming application 1001 includes a plug-in which generates MLA job commands in a format accepted by the web services provider 1033 (such as an API call). d The interactive programming application 1001 is used to call a framework for training and deployment of a ML algorithm (for example, as detailed above). In some embodiments, the interactive programming application 1001 calls a fit routine that allows a user to specify to wait for a remote job to complete and to show the output (such as logs) while waiting. In some embodiments, the fit routine includes one or more of the following parameters: inputs (strings) that identifying the location where training data is saved; wait (boolean) that specifies whether the call shall wait until the job completes; logs (bool) that specifies whether to show the logs produced by the job; and job_name (string) that optionally forces a specific job_name for the training job. In some embodiments, the fit routine includes one or more of the following parameters: entry_point (string) which indicates a path (absolute or relative) to a file which should be executed as the entry point to training; source_dir (string) which is a path (absolute or relative) to a directory with any other training source code dependencies; hyperparameters that will be used for training; enable_metrics (boolean) that indicates when training and hosting containers will generate metrics under the namespace; container_log_level (integer) that indicates a log level to use within the container; and code_location (string) that is a location of custom code.

The control plane 1007 make decisions about how traffic is to be routed inside of the web services provider 1033. In the context of remote-based MLA jobs, the control plane 1007 routes MLA job commands to cause instances (training or inference) to be started, stopped, modified, etc. Exemplary commands utilized by a user of the interactive programming application 1001 (and routed via the control plane 1007) may include job commands to: start an instance (or inference), stop an instance (or inference), pause an instance (or inference), resume an instance (or inference), request the status of an instance (or inference), and/or modify an instance (or inference). In some embodiments, the commands come from the interactive programming application 1001 as application programming interface (API) calls (for example, API calls generated by an included plug-in).

Training instance 1021 executes an algorithm 1023 utilizing training data 1019 to output a model 1017 in response to a start or modify command. In some embodiments, the training instance 1021 is a container 130 with the code 136 including the algorithm 103 running on a VM instance 122 such as detailed earlier. The generated model 1017 is stored as directed by the job. For example, the generated model 1017 may be stored at the web services provider 1033 (or other remote location) and/or sent back to the job requesting device (such as the device that runs the interactive programming application). The locations of the training data 1019 and storage area for the model 1017 are typically provided by the job request generated by the interactive programming application 1001.

The generated model 1017 is an input to one or more inference instances 1009. The one or more inference instances 1009 utilize one or more algorithms to perform a comparison of inferences using evaluation data 1015 using the generated model 1017 against known results. Evaluation output 1013 is stored locally to the web services provider 1033 and/or or is provided to the interactive programming application 1001. The locations of the evaluation data 1015 and storage area for the evaluation output 1013 are typically provided by the job request. In some embodiments, the one or more inference instances 1009 are provided using one or more VM instances 142 and one or more ML scoring containers 150 where the algorithm(s) 1011 are the code 156 of the container(s) 150. In some embodiments, the inference instance(s) 1009 perform batch inferencing.

Note, in some embodiments, the training data 1019 and evaluation data 1015 are a part of the same data set. For example, 75% of the data set may be used for the training data 1019 and the remaining 25% of the data set is used for evaluation data 1015.

Coupled to both the training instance(s) 1021 and inference instance(s) 1009 are a web services monitoring log component 1003 and/or a web services metrics component 1005. These components 1003 and 1005 interface with the interactive programming application 1001 and provide log event data (record of activity) and metrics including, for example, resource usage and model information as detailed above. In some embodiments, the web services metrics component 1005 is a part of the ML model evaluator 128. The interactive programming application 1001 uses this information to approximate the training and/or inference instance(s) 1021/1009 running on the interactive programming application 1001 instead of remotely.

Additionally, in some embodiments, coupled to both training instance(s) 1021 and inference instance(s) 1009 is storage 1031 for the status of the instance(s) 1021/1009. For example, the state of the command is stored in storage 1031 in some embodiments. Partial or intermediate results may be stored in storage 1031. For example, when an instance 1021/1009 is stopped, the intermediate results are stored in storage 1031 in some embodiments. While this storage is shown within the web services provider 1033, in some embodiments, this storage (or a redundant version) is stored locally with the interactive programming application 1001 in an end user device 102.

The illustration of FIG. 10 includes circles with letters inside. Each of these circles represents an action that may be taken. For example, at circle A, the interactive programming application 1001 provides one or more commands to the control plane 1007 for it to route. These commands control how the training instance(s) 1021 control a job for a machine learning training algorithm 1023 and/or how batch inference(s) 1009 control a job for a machine learning algorithm 1011.

The control plane 1007 sends received commands to an appropriate entity in circles B and C. For example, if the command is to start a training instance, then a start command is sent at circle B.

In some embodiments, the training instance(s) 1021 utilize training data 1019 that is accessed at circle D and output a model when training is complete at circle E.

In some embodiments, the inference instance(s) 1009 take in a model 1017 at circle F and utilize evaluation data 1015 that is accessed at circle G to determine results of inference comparisons (the output is shown at circle H).

The training instance(s) 1021 and inference instance(s) 1009 provide log information to the web services monitoring log 1003 and/or metrics to the web services metrics component 1005 at circle I and J. The metric and log information is provided to the interactive programming application 1001.

Figure 11:
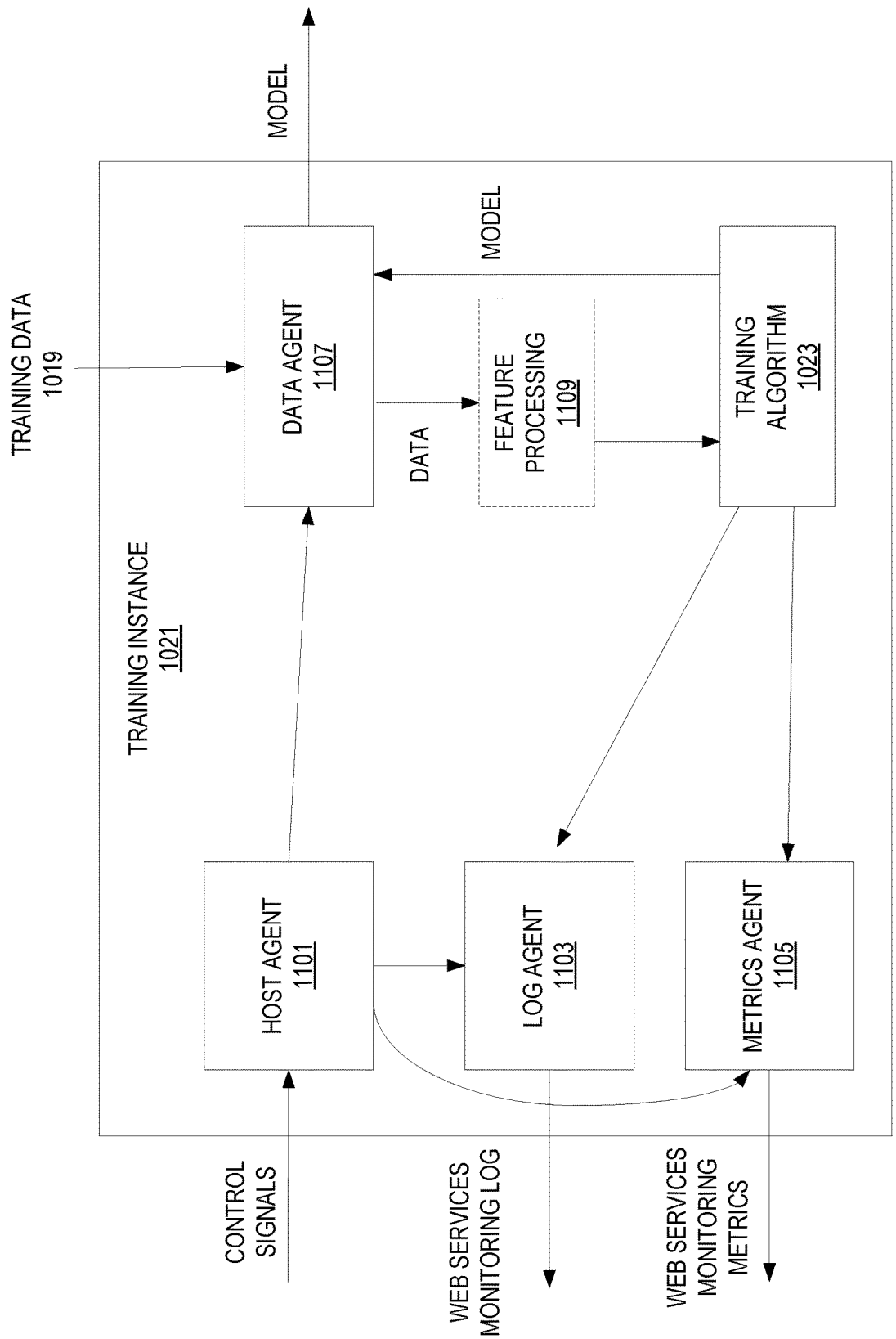
FIG. 11 illustrates embodiments of a training instance.

FIG. 11 illustrates embodiments of a training instance. As discussed earlier, the training instance 1021 executes a training algorithm 1023 and outputs a model 1017. The training instance 1021 outputs metric and log data. A plurality of agents provide the functionality of the training instance 1021. In some embodiments, each agent is a container. Additionally, in some embodiments, the agents, feature processing 1109, and algorithm 1023 are a part of code 136 of a container. In some embodiments, each agent is a separate container.

A data agent 1107 receives training data 1019 and provides that data to the training algorithm 1023 and receives back model information which is then output.

Control signals (e.g., a command) from the control plane 1007 are received by host agent 1101. These control signals are used to configure which algorithm 1023 to use, the location of the training data 1019, etc. The control signals are also used to configure a log agent 1103 and metrics agent 1105 of the training instance 1021.

The log and metrics agents 1103 and 1105 provide metric and log information to the web services monitoring service. In some embodiments, the agents 1103 and 1105 format information from the execution of the algorithm 1023.

In some embodiments, a feature processor 1109 formats the training data 1019 into a format acceptable by the training algorithm 1023.

Figure 12:
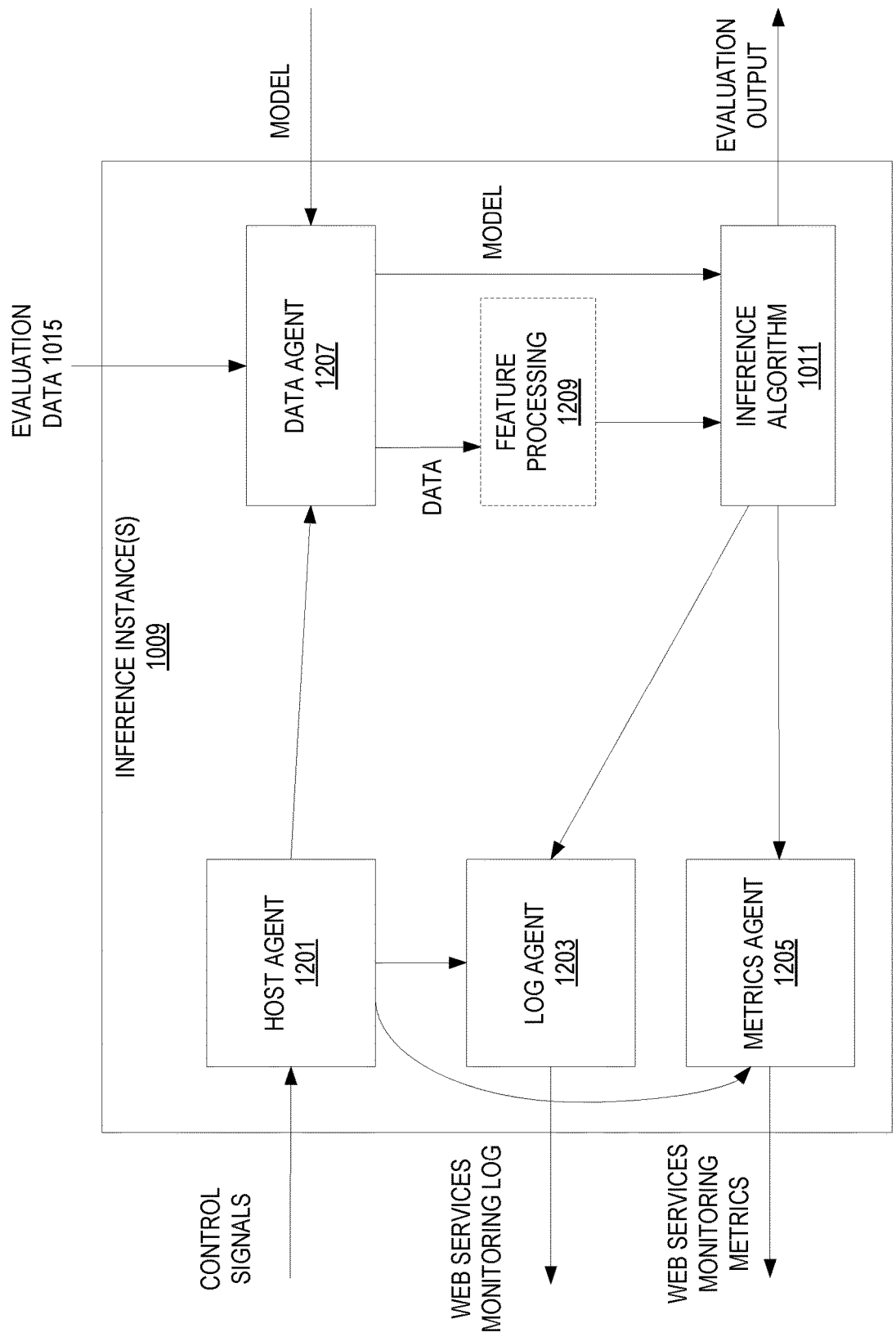
FIG. 12 illustrates embodiments of an inference instance.

FIG. 12 illustrates embodiments of an inference instance. As discussed earlier, the inference instance 1009 executes one or more inference algorithm(s) 1011 using evaluation data 1015. The inference instance 1009 outputs metric and log data. A plurality of agents provide this functionality. In some embodiments, each agent is a container. Additionally, in some embodiments, the agents, feature processing 1209, and algorithm(s) 1011 are a part of code 156 of a container. In some embodiments, each agent is a separate container. In some embodiments, batch inferencing is performed by chaining algorithms 1011.

A data agent 1207 receives evaluation data 1015 and the model 1017 and provides that data to the inference algorithm 1011.

Control signals (e.g., a command) from the control plane 1007 are received by host agent 1201. These control signals are used to configure which algorithm 1011 to use, the location of the evaluation data 1015, etc. The control signals are also used to configure a log agent 1203 and metrics agent 1205 of the inference instance 1009.

The log and metrics agents 1203 and 1205 provide metric and log information to the web services monitoring service. In some embodiments, the agents 1203 and 1205 format information from the execution of the algorithm 1011.

In some embodiments, a feature processing container 1209 formats the evaluation data 1015 into a format acceptable to the inference algorithm 1011.

Figure 13:
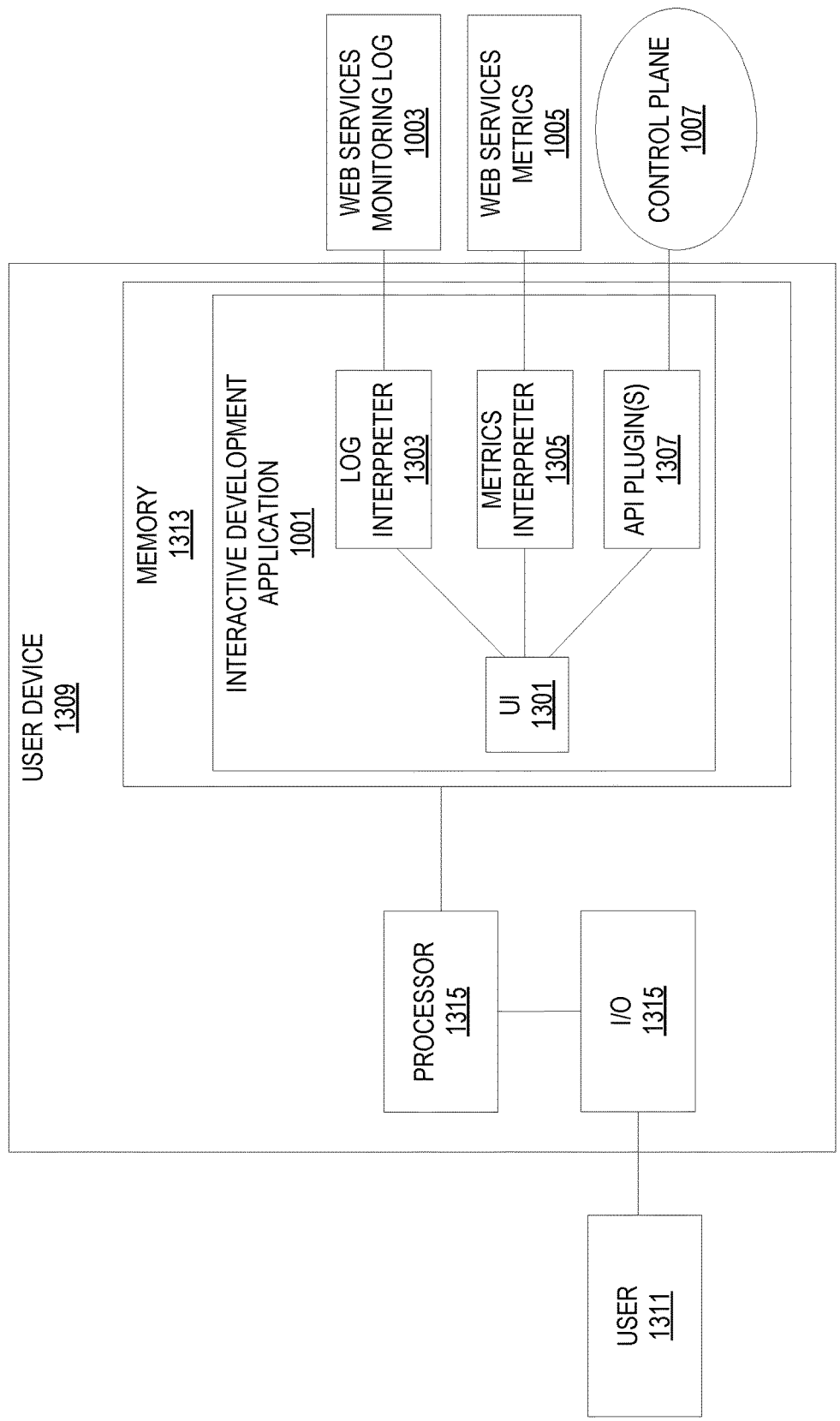
FIG. 13 illustrates embodiments of a user device that includes an interactive programming environment.

FIG. 13 illustrates embodiments of a user device 1309 that includes an interactive programming application 1001. As shown, the user device 1309 includes a processor 1315 that is coupled to input/output mechanisms 1315 and memory 1313. The input/output mechanisms 1315 provide a means of communication with a user 1311 such as a keyboard, mouse, display, etc.

Memory 1313 stores the interactive programming application 1001 to be executed by the processor 1315. The interactive programming application 1001 includes a log interpreter 1303 to interpret log data from the web services monitoring log component 1003 and a metrics interpreter 1305 to interpret metrics data from the web services monitoring metrics component 1005. API plugin(s) 1307 generate commands to send to the control plane 1007 of the web services provider 1003. A user interface component 1301 generates display information about jobs (such as interpreted log and metric data), provide a means for configuring a job through the API plugin(s) 1307, etc.

Figure 14:
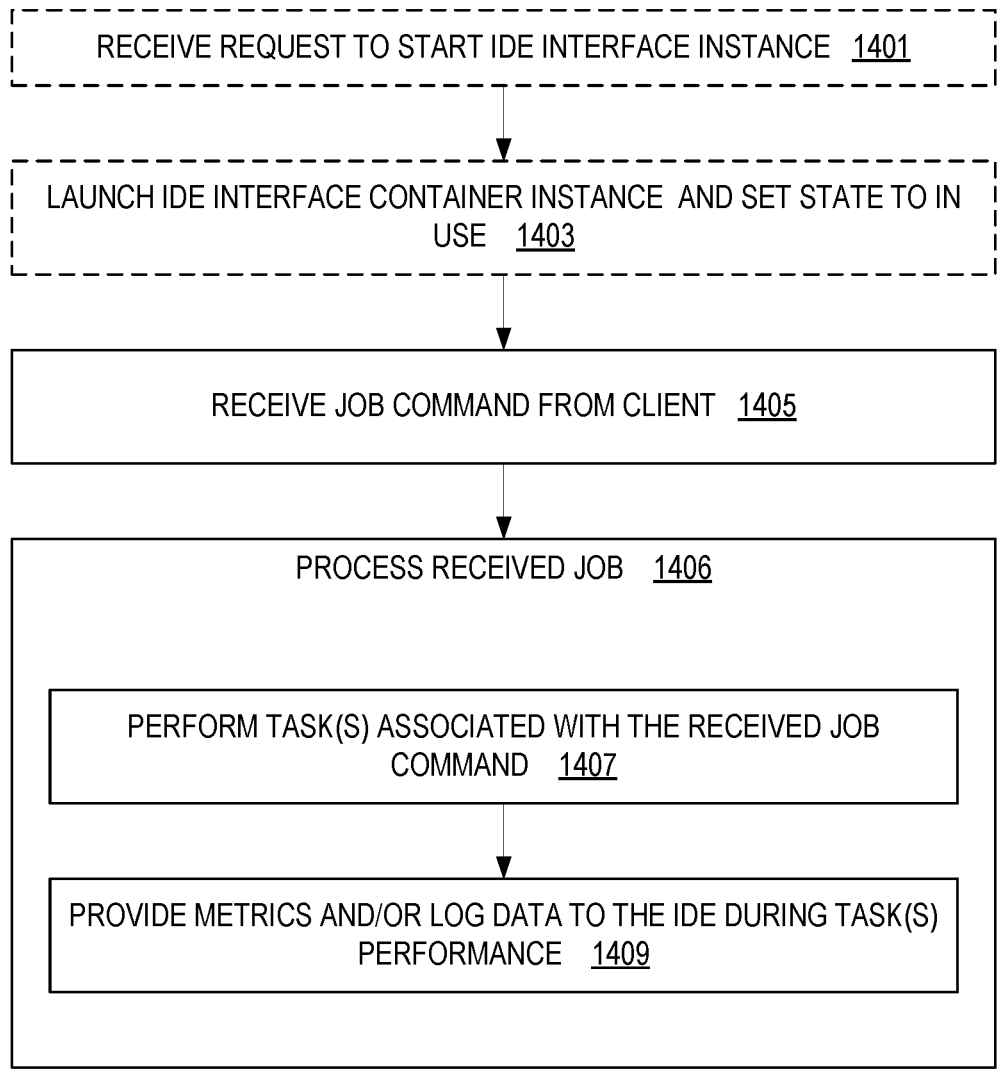
FIG. 14 illustrates embodiments of a method of remote job execution.

FIG. 14 illustrates embodiments of a method of remote job execution. In some embodiments, this method is performed by a model training system of a web services provider or model evaluation system of a web services provider as described earlier.

At 1401, in some embodiments, a request to start an interactive programming environment (IDE) interface instance is received. For example, a request to launch a machine learning compute instance is received.

At 1403, in some embodiments, the IDE interface instance is launched. This instance allows for a remote interactive programming environment (e.g., the interactive programming application discussed above) to connect to the web services provider.

A job command is received from a client at 1405. For example, in some embodiments, the request is from an IDE. For example, a job command is received at a control plane of the web services provider. Exemplary job commands have been detailed above and details of handling of at least some of these job commands will be highlighted in figures that follow.

At 1406, the received job command is processed. For example, a virtual machine instance is initialized (if needed), the training/evaluation data is retrieved from storage, the container for the job is initialized in the VM instance, and the code of the container is executed according to the request (for example, the job will use the algorithm, hyperparameters, etc. as specified). Executing the job may take the form of one or more actions. Two such actions that may be performed are detailed. At 1407, the task(s) associated with the received job command are performed. Exemplary tasks include starting, stopping, pausing, modifying, etc. a MLA training or inference job. For example, a container instance performs the tasks of the code (algorithm) stored therein in response to a command such as starting (and running) a training job. These tasks come via a host agent and are supplied to a data agent in some embodiments.

Further, during execution, metrics and/or log data are provided to the client during the task(s) performance at 1409. For example, as a MLA job is running, metrics and/or log data are sent back to the client such that it may appear to a user that the MLA job is running locally. In some embodiments, log and metrics agents of an instance, as discussed above, provide this data to services which then provide them to the client.

FIGS. 15-21 illustrates more specific embodiments of handling job commands in a model training system of a web services provider or model evaluation system of a web services provider as described earlier.

Figure 15:
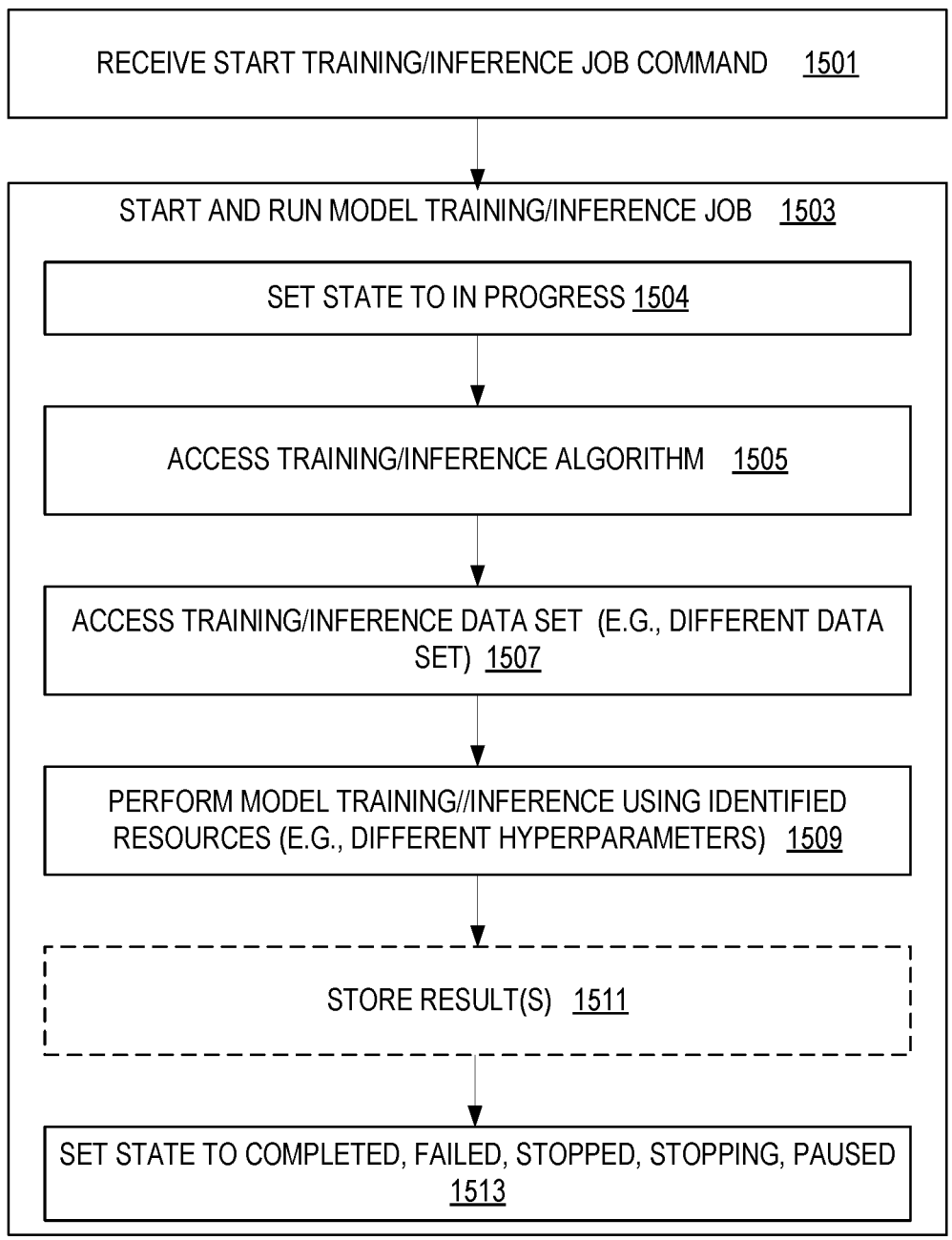

FIG. 15 illustrates embodiments of handling a start job command. The start job command is used to start the running of a MLA job including the starting of training and/or inference. At 1501, the start training or inference job command is received from a client. For example, the command is received by a control plane of a web services provider.

In some embodiments, the start job command is a "create training job" request which starts a model training job. When the start command is for training, after training completes, the resulting model is stored in a database location and/or sent to the IDE (as specified). In the request body of the start command, one or more of the following are provided: 1) algorithm specification—identifying the training algorithm to use; 2) hyperparameters—specifying specific parameters to influence the quality of the final model; 3) input data configuration—a description of the training dataset and the location where it is stored; 4) output data configuration—identifying the location where the results of model training, the model artifacts and other optional output are to be stored; 4) resource configuration—identifying the resources, instances, and storage volumes to deploy for model training; 5) RoleRN—the resource number (RN) that the web services provider uses to perform tasks on the user's behalf during model training; 6) stopping condition—a duration for training; and 7) a name of the job. In some embodiments, when a job is terminated because of a stopping condition, the intermediate results are stored as directed.

In some embodiments, the start job command is a "create inference job" request which starts a model inference evaluation job. When the start command is for inference evaluation, after the evaluation completes, the resulting output is stored in a database location or sent to the client (as specified). In the request body, one or more of the following are provided: 1) algorithm specification—identifying the training algorithm to use; 2) hyperparameters—specifying specific parameters to influence the quality of the final model; 3) input data configuration—a description of the evaluation dataset and the location where it is stored; 4) output data configuration—identifying the location where the results of model evaluation are to be stored; 4) resource configuration—identifying the resources, instances, and storage volumes to deploy for model inference evaluation; 5) RoleRN—the resource number (RN) that the web services provider uses to perform tasks on the user's behalf during model training; 6) stopping condition—a duration for evaluation; and 7) a name of the job. In some embodiments, when a job is terminated because of a stopping condition, the intermediate results are stored as directed.

The job for training or inference is started according to the request at 1503. For example, a virtual machine instance is initialized (if needed), the training/evaluation data is retrieved from storage, the container for the job is initialized in the VM instance, and the code of the container is executed according to the request (for example, the job will use the algorithm, hyperparameters, etc. as specified). During the running of the job, one or more actions may take place as detailed herein.

At 1504, the state of the job is set to "in progress" to indicate that the job is running. The state is set in storage 1031 in some embodiments. The "in progress" indication is also shared with the client that made the request.

The training/inference algorithm 1505 to be used by the job is accessed at 1505. For example, the storage location of the algorithm as indicated by the request is accessed to retrieve the algorithm. The algorithm may be a part of a container as detailed above.

The training/inference data set (such as training data 1019 or evaluation data 1015) to be used by the job is accessed at 1507. For example, the storage location of the data set as indicated by the request is accessed to retrieve the data set.

A training or inference instance is instantiated and performs model training or inference evaluation using the identified resources (such as hyperparameters) at 1509. Examples of instantiation have been detailed. During the performance of the training or inference evaluation, metrics and log data are shared with the client that made the request.

At 1511, in some embodiments, the results of the training (model) or inference (evaluation output) are stored as applicable. In some embodiments, the results are sent to the IDE.

Depending upon the implementation, if the job does not complete, in some embodiments, partial results are stored, while in other embodiments partial results are not stored. The storage of partial results allows for a job to be restarted from the stopping point.

The state of the job is changed at 1513. For example, if the job completed, the state is set to "completed," if the job failed, the state is set to "failed," if the job was stopped, the state is set to "stopped," and if the job was paused, the state is set to "paused."

FIG. 16 illustrates an example of a start instance request syntax according to some embodiments. This syntax is generated by a client plugin in some embodiments. The start instance request syntax includes specification of the algorithm to be used at 1601. In particular, the image (container) to use is specified in this example. Hyperparameters 1603 are also provided.

Input data configuration 1605 shows where to find the data to be used (e.g., database location) and how the data is formatted. In some embodiments, the data will be subjected to feature processing as detailed. Normally, the feature processing to be used is also a part of the request (but not shown here). Output data configuration 1607 is similarly laid out.

Resource configuration 1609 dictating what hardware resources to use is also provided in some embodiments. For example, how many instances to start, what type of hardware to run on (instance type), etc.

The resource number (RN) that the web services provider uses to perform tasks on the user's behalf during model training is provided at 1611 along with a stopping condition 1613.

Figure 17:
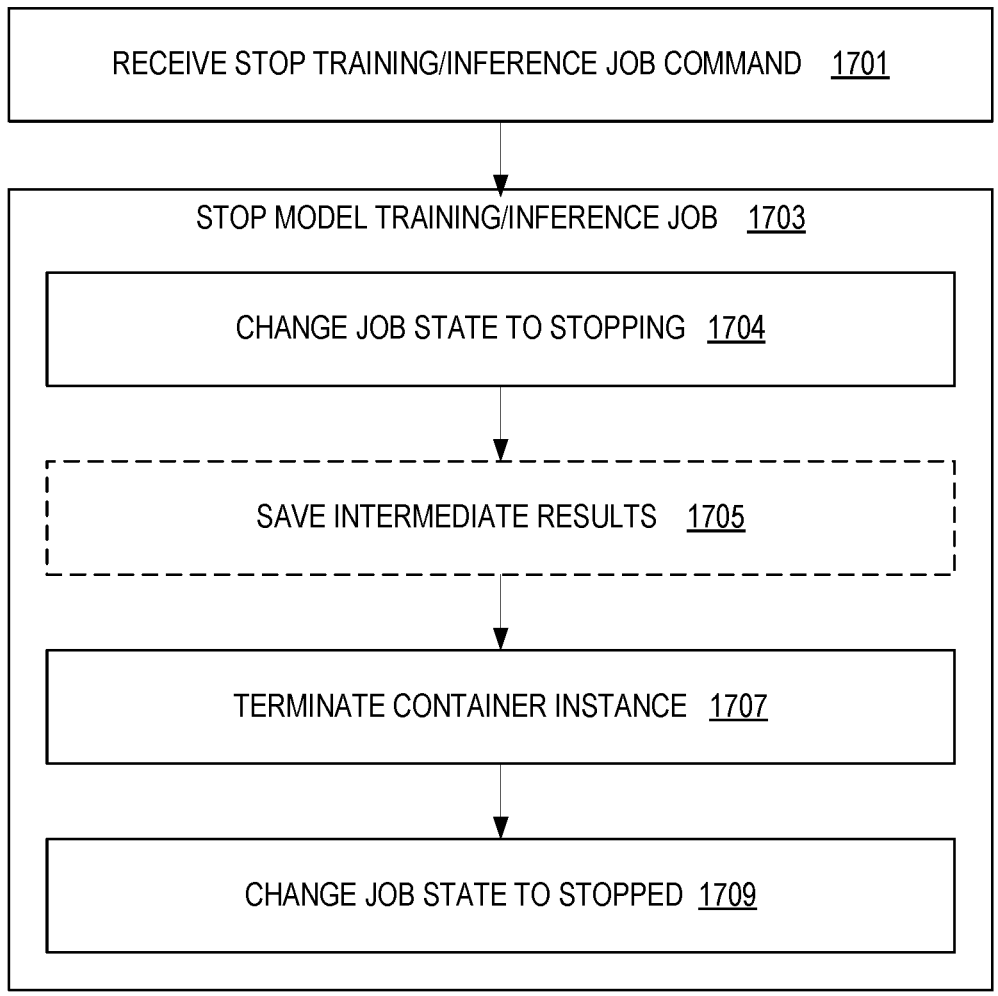

FIG. 17 illustrates embodiments of handling a stop job command. The stop command is used to stop the running of a MLA job, including the stopping of training and/or inference. At 1701, the stop job command is received from a client. For example, the command is received by a control plane of a web services provider.

In some embodiments, the stop command is a "stoptrainingjob/stopinferencejob" request which stops a model training/inference job. In the request body, one or more of the following are provided: 1) output data configuration—identifying the location where the results of model training, the model artifacts, and other optional output are to be stored; and 2) a name of the job.

The job for training or inference is stopped according to the request at 1703. For example, the container for the job is halted in a VM, in some embodiments, according to the request. During the stopping of the job, one or more actions may take place as detailed herein.

At 1704, the state of the job is set to "stopping" to indicate that the job is stopping. The state is set in storage 1031 in some embodiments. The stopping indication is also shared with the client that made the request.

At 1705, in some embodiments, the partial results of the training (model) or inference (evaluation output) are stored as applicable. In some embodiments, the results are sent to the client.

At 1707, the container instance(s) for the job are terminated.

The state of the job is changed to stopped at 1709.

Figure 18:
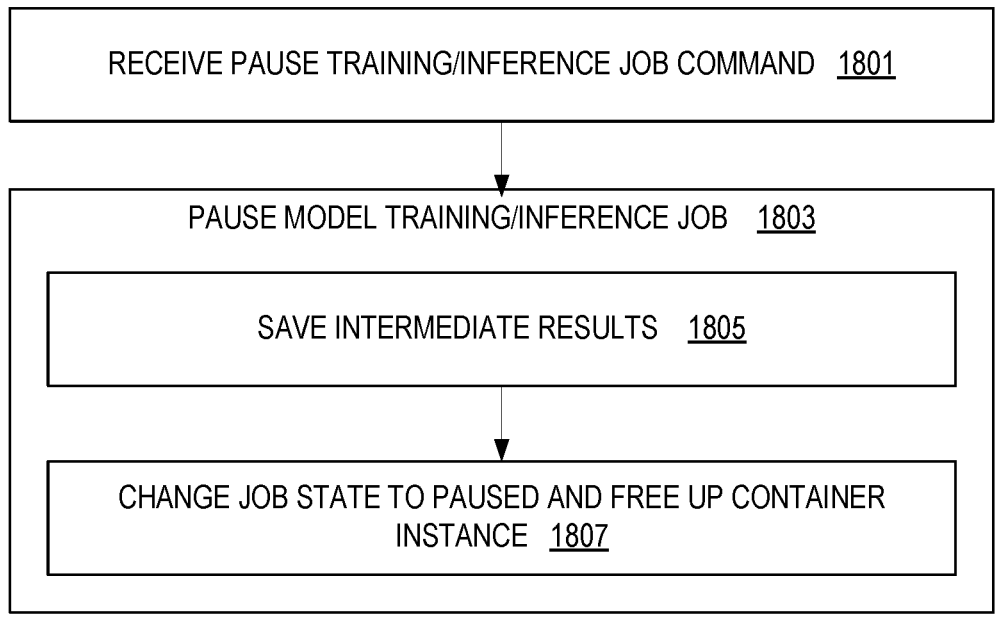

FIG. 18 illustrates embodiments of handling a pause job command. The pause job command is used to pause the running of a MLA job including the pausing of training and/or inference. In some embodiments, a pause job is an advanced type of stop. At 1801, the pause training or inference job command is received from a client. For example, the command is received by a control plane of a web services provider.

In some embodiments, the pause job command is a "pausetrainingjob/pauseinferencejob" request which pauses a model training/inference job. In the request body, one or more of the following are provided: 1) output data configuration and 2) a name of the job.

The job for training or inference is paused according to the request at 1803. For example, the container for the job is halted in a VM, in some embodiments, according to the request. During the pausing of the job, one or more actions may take place as detailed herein.

At 1805, in some embodiments, the partial results of the training (model) or inference (evaluation output) are stored as applicable. In some embodiments, the results are sent to the client. The state of the job is changed to paused and the container instance is freed at 1807.

Figure 19:
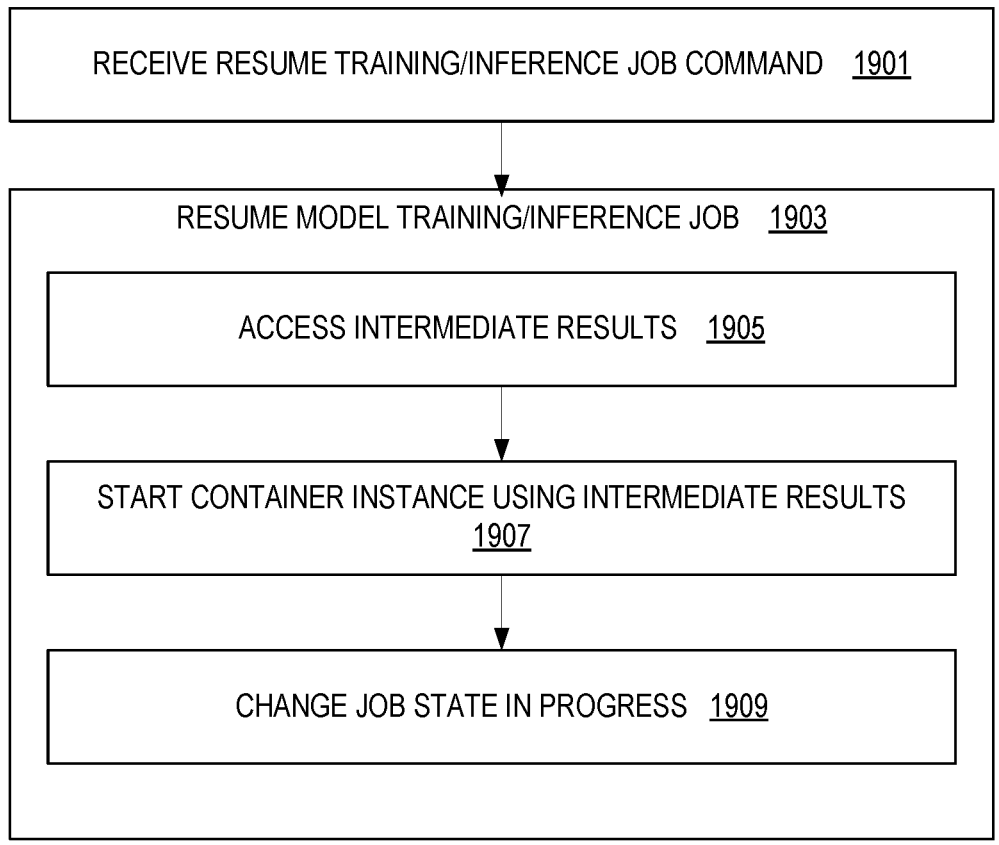

FIG. 19 illustrates embodiments of handling a resume job command. The resume job command is used to resume the running of a stopped or paused MLA job including the resumption of training and/or inference. At 1901, the resume training or inference job command is received from a client. For example, the command is received by a control plane of a web services provider.

In some embodiments, the resume job command is a "resumetrainingjob/resumeinferencejob" request which resumes a model training/inference job. In the request body, one or more of the following are provided: 1) algorithm specification—identifying the training algorithm to use; 2) hyperparameters—specifying specific parameters to influence the quality of the final model; 3) input data configuration—a description of the evaluation dataset and the location where it is stored; 4) output data configuration—identifying the location where the results of model evaluation are to be stored; 4) resource configuration—identifying the resources, instances, and storage volumes to deploy for model inference evaluation; 5) RoleRN—the resource number (RN) that the web services provider uses to perform tasks on the user's behalf during model training; 6) stopping condition—a duration for evaluation; and 7) a name of the job.

The job for training or inference is resumed according to the request at 1903. For example, the container for the job is restarted in a VM, in some embodiments, according to the request. During the restarting of the job, one or more actions may take place as detailed herein.

At 1905, in some embodiments, the partial results of the training (model) or inference (evaluation output) are accessed as applicable. The container instance is restarted using the intermediate results at 1907. The state of the job is changed to in progress at 1909.

Figure 20:
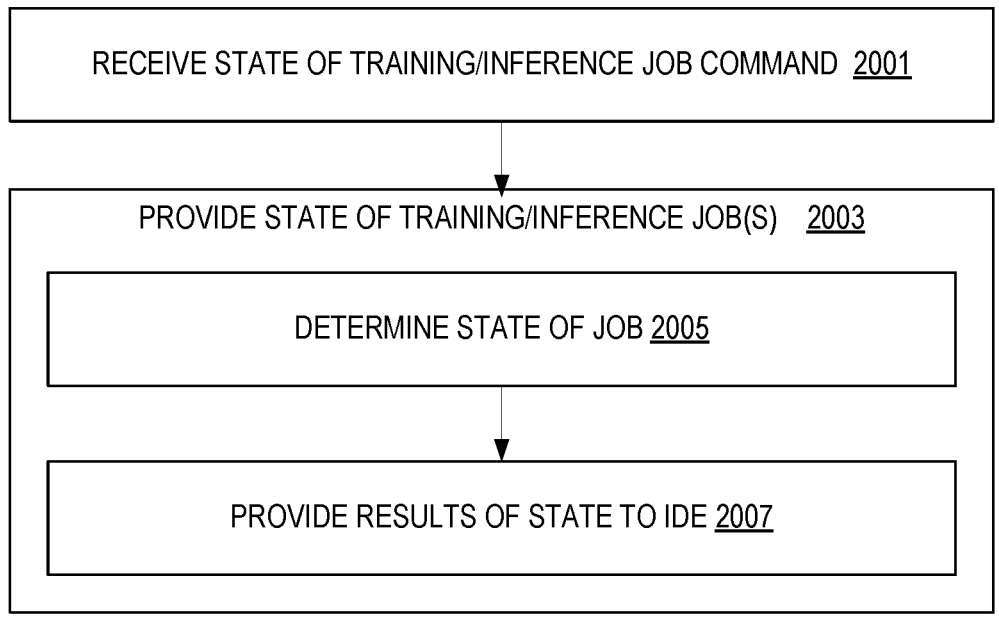

FIG. 20 illustrates embodiments of handling a state of job command. The state of job command is used to get the state of the running of a MLA job at a given point in time. At 2001, the state of job training or inference job command is received from a client. For example, the command is received by a control plane of a web services provider.

In some embodiments, the state of job command is a statetrainingjob/stateinferencejob request. In the request body, the name of the job is provided.

The state of the job for training or inference is provided according to the request at 2003.

At 2005, the state is determined. For example, the storage of status 1031 of jobs is queried by the name of the job. The results of the access are provided to the client at 1907.

Figure 21:
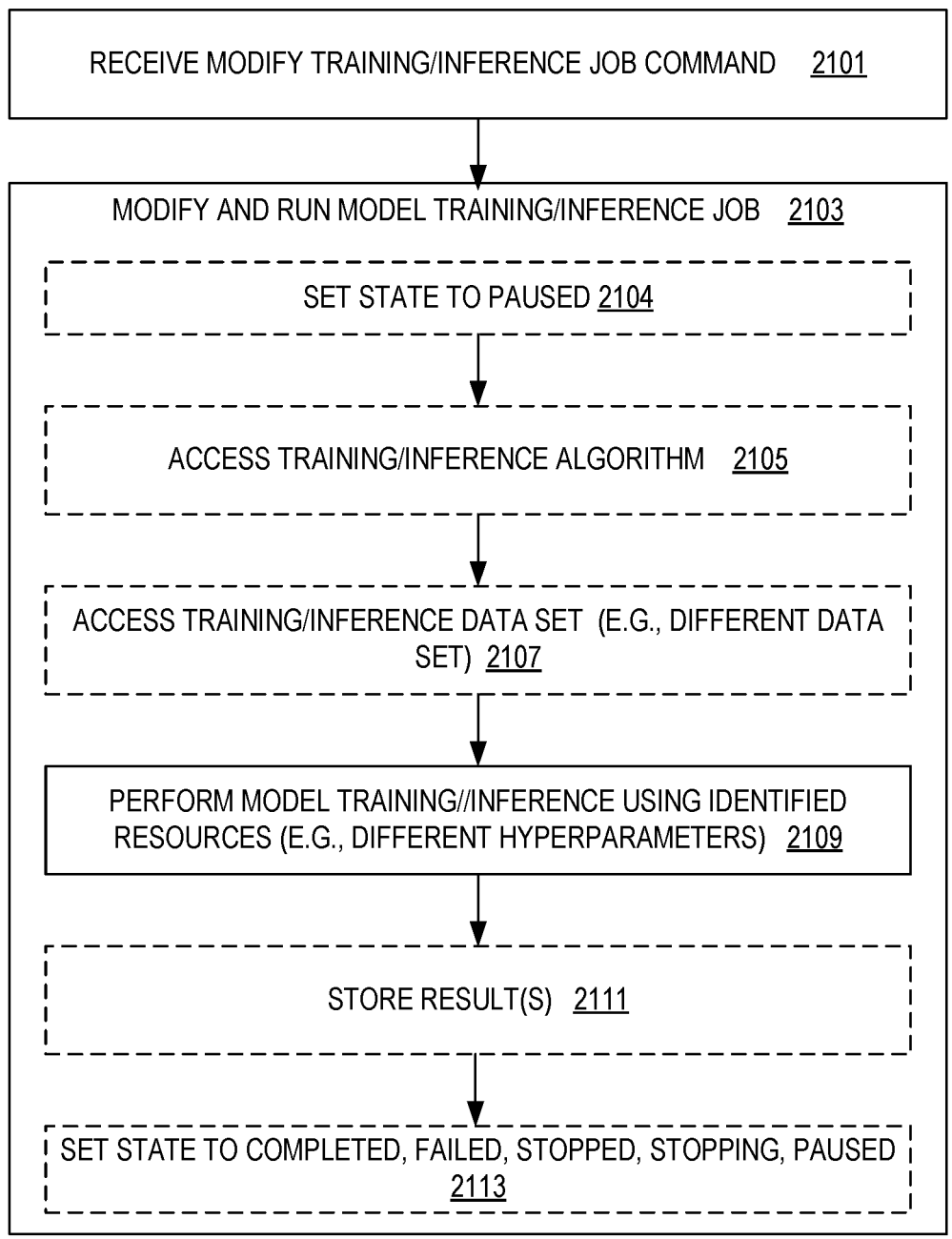

FIG. 21 illustrates embodiments of handling a modify job command. The modify job command is used to modify the running of a MLA job including the starting of training and/or inference. At 2101, the modify training or inference job command is received from a client. For example, the command is received by a control plane of a web services provider.

In some embodiments, the modify job command is a "modifytrainingjob" request which modifies a model training job. When the modify command is for training, after training completes, the resulting model is stored in a database location and/or sent to the client (as specified). In the request body, one or more of the following are provided: 1) algorithm specification—identifying the training algorithm to use; 2) hyperparameters—specifying specific parameters to influence the quality of the final model; 3) input data configuration—a description of the training dataset and the location where it is stored; 4) output data configuration—identifying the location where the results of model training, the model artifacts and other optional output are to be stored; 4) resource configuration—identifying the resources, instances, and storage volumes to deploy for model training; 5) RoleRN—the resource number (RN) that the web services provider uses to perform tasks on the user's behalf during model training; 6) stopping condition—a duration for training; and 7) a name of the job. In some embodiments, when a job is terminated because of a stopping condition, the intermediate results are stored as directed.

In some embodiments, the modify job command is a "modifyinferencejob" request which modifies a model inference evaluation job. When the modify command is for inference evaluation, after the evaluation completes, the resulting output is stored in a database location or sent to the client (as specified). In the request body, one or more of the following are provided: 1) algorithm specification—identifying the training algorithm to use; 2) hyperparameters—specifying specific parameters to influence the quality of the final model; 3) input data configuration—a description of the evaluation dataset and the location where it is stored; 4) output data configuration—identifying the location where the results of model evaluation are to be stored; 4) resource configuration—identifying the resources, instances, and storage volumes to deploy for model inference evaluation; 5) RoleRN—the resource number (RN) that the web services provider uses to perform tasks on the user's behalf during model training; 6) stopping condition—a duration for evaluation; and 7) a name of the job. In some embodiments, when a job is terminated because of a stopping condition, the intermediate results are stored as directed.

The job for training or inference is modified according to the request at 2103. For example, a new virtual machine instance is initialized (if needed), the training/evaluation data is retrieved (if different data is to be used), the container for the job is initialized in the VM instance (if a new container is to be used), and the code of the container is executed according to the request (for example, the job will use the algorithm, hyperparameters, resources, storage locations, etc. as specified). During the running of the job, one or more actions may take place as detailed herein.

At 2104, the state of the job is set to "paused" to indicate that the job is paused in some embodiments. In some embodiments, when the job is already paused or stopped, there is no state change. The state is set in storage 1031 in some embodiments. The paused indication is also shared with the client that made the request.

The training/inference algorithm 2105 to be used by the job is accessed at 2105 (if needed). For example, the storage location of the algorithm as indicated by the request is accessed to retrieve the algorithm. The algorithm may be a part of a container as detailed above.

The training/inference data set (such as training data 1019 or evaluation data 1015) to be used by the job is accessed at 2107 (if needed). For example, the storage location of the data set as indicated by the request is access to retrieve the data set.

A training or inference instance performs model training or inference evaluation using the identified resources (such as hyperparameters) at 2109 and the state is set to "in progress." Examples of instantiation have been detailed. During the performance of the training or inference evaluation, metrics and log data are shared with the client that made the request.

At 2111, in some embodiments, the results of the training (model) or inference (evaluation output) are stored as applicable. In some embodiments, the results are sent to the IDE. Depending upon the implementation, if the job does not complete, in some embodiments, partial results are stored, while in other embodiments partial results are not stored. The storage of partial results allows for a job to be restarted from the stopping point.

The state of the job is changed at 2113. For example, if the job completed, it is set to "completed," if the job failed, the state is set to "failed," if the job was stopped, the state is set to "stopped," and if the job was paused, the state is set to "paused."

Figure 22:
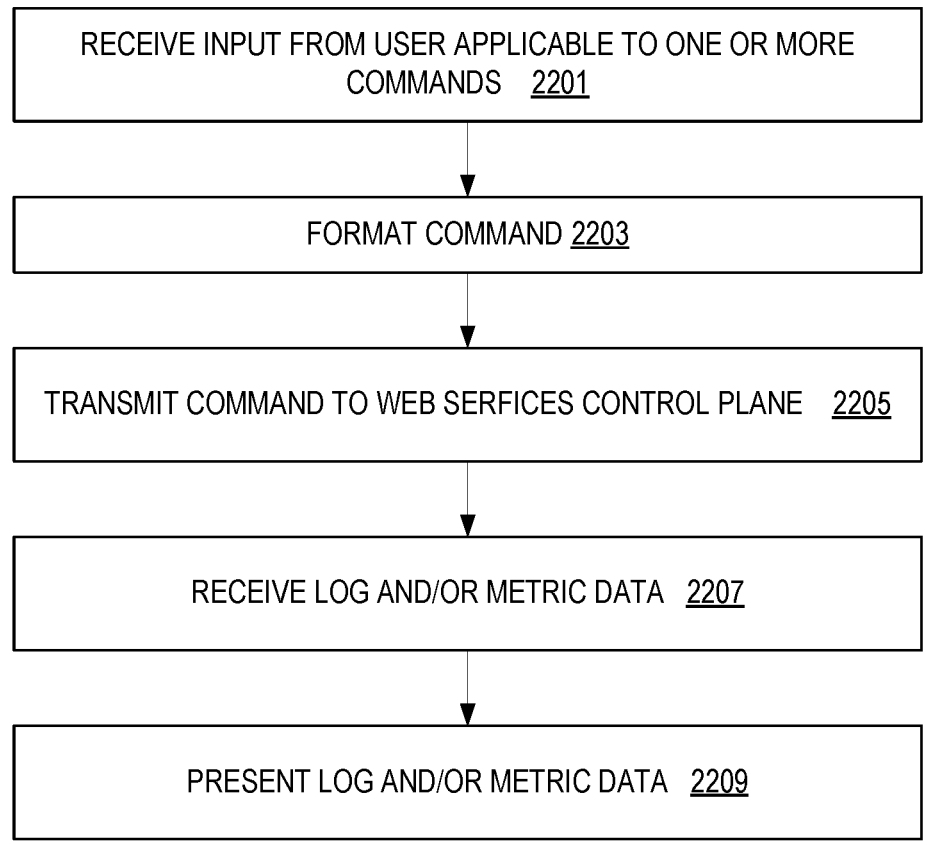
FIG. 22 illustrates embodiments of a method performed by an interactive programming environment that is interacting with a web services provider for a remote job.

FIG. 22 illustrates embodiments of a method performed by an interactive programming environment that is interacting with a web services provider for a remote job. In some embodiments, this method is embodied as software stored on an end user device and executed by a processor of that device.

At 2201, input from a user applicable to one or more commands is received. For examples, parameters of a command are received such as a job_name, resources to use, algorithm to use, storage locations, etc.

At 2203, the interactive programming environment formats a command from the received input. In some embodiments, the formatting is performed by a plugin.

The formatted command is sent to the web services provider control plane at 2205. The control plane directs the command as needed.

During execution of the command, log and/or metric data is received by the interactive programming environment from the web services provider about the remote job at 2207.

The log and/or metric data is presented to the user at 2209. For example, the status of the remote job is shown as a graph in some embodiments.

Figure 23:
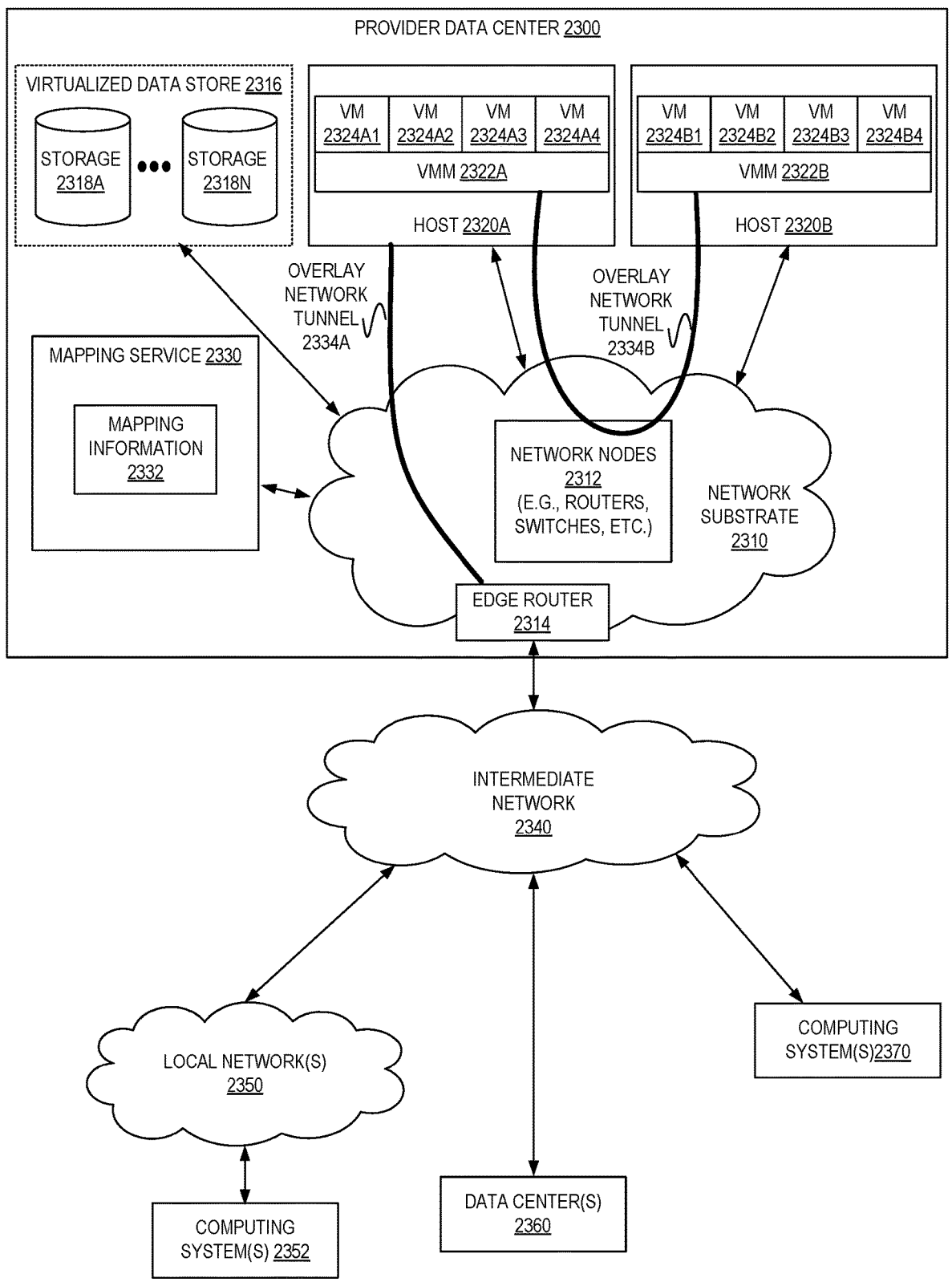
FIG. 23 illustrates an example data center that implements an overlay network on a network substrate using IP tunneling technology, according to some embodiments.

FIG. 23 illustrates an example data center that implements an overlay network on a network substrate using IP tunneling technology, according to some embodiments. A provider data center 2300 may include a network substrate that includes networking nodes 2312 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 2310 using tunnels. The IP tunneling technology may provide a mapping and encapsulating system for creating an overlay network on a network (e.g., a local network in data center 2300 of FIG. 23) and may provide a separate namespace for the overlay layer (the public IP addresses) and the network substrate 2310 layer (the local IP addresses). Packets in the overlay layer may be checked against a mapping directory (e.g., provided by mapping service 2330) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 2330) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 23, an example overlay network tunnel 2334A from a virtual machine (VM) 2324A (of VMs 2324A1-2324A4, via VMM 2322A) on host 2320A to a device on the intermediate network 2350 and an example overlay network tunnel 2334B between a VM 2324A (of VMs 2324A1-2324A4, via VMM 2322A) on host 2320A and a VM 2324B (of VMs 2324B1-2324B4, via VMM 2322B) on host 2320B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 23, at least some networks in which embodiments may be implemented may include hardware virtualization technology that enables multiple operating systems to run concurrently on a host computer (e.g., hosts 2320A and 2320B of FIG. 23), i.e. as virtual machines (VMs) 2324 on the hosts 2320. The VMs 2324 may, for example, be executed in slots on the hosts 2320 that are rented or leased to customers of a network provider. A hypervisor, or virtual machine monitor (VMM) 2322, on a host 2320 presents the VMs 2324 on the host with a virtual platform and monitors the execution of the VMs 2324. Each VM 2324 may be provided with one or more local IP addresses; the VMM 2322 on a host 2320 may be aware of the local IP addresses of the VMs 2324 on the host. A mapping service 2330 may be aware of (e.g., via stored mapping information 2332) network IP prefixes and IP addresses of routers or other devices serving IP addresses on the local network. This includes the IP addresses of the VMMs 2322 serving multiple VMs 2324. The mapping service 2330 may be centralized, for example on a server system, or alternatively may be distributed among two or more server systems or other devices on the network. A network may, for example, use the mapping service technology and IP tunneling technology to, for example, route data packets between VMs 2324 on different hosts 2320 within the data center 2300 network; note that an interior gateway protocol (IGP) may be used to exchange routing information within such a local network.

In addition, a network such as the provider data center 2300 network (which is sometimes referred to as an autonomous system (AS)) may use the mapping service technology, IP tunneling technology, and routing service technology to route packets from the VMs 2324 to Internet destinations, and from Internet sources to the VMs 2324. Note that an external gateway protocol (EGP) or border gateway protocol (BGP) is typically used for Internet routing between sources and destinations on the Internet. FIG. 23 shows an example provider data center 2300 implementing a network that provides resource virtualization technology and that provides full Internet access via edge router(s) 2314 that connect to Internet transit providers, according to some embodiments. The provider data center 2300 may, for example, provide customers the ability to implement virtual computing systems (VMs 2324) via a hardware virtualization service and the ability to implement virtualized data stores 2316 on storage resources 2318A-2318N via a storage virtualization service.

The data center 2300 network may implement IP tunneling technology, mapping service technology, and a routing service technology to route traffic to and from virtualized resources, for example to route packets from the VMs 2324 on hosts 2320 in data center 2300 to Internet destinations, and from Internet sources to the VMs 2324. Internet sources and destinations may, for example, include computing systems 2370 connected to the intermediate network 2340 and computing systems 2352 connected to local networks 2350 that connect to the intermediate network 2340 (e.g., via edge router(s) 2314 that connect the network 2350 to Internet transit providers). The provider data center 2300 network may also route packets between resources in data center 2300, for example from a VM 2324 on a host 2320 in data center 2300 to other VMs 2324 on the same host or on other hosts 2320 in data center 2300.

A service provider that provides data center 2300 may also provide additional data center(s) 2360 that include hardware virtualization technology similar to data center 2300 and that may also be connected to intermediate network 2340. Packets may be forwarded from data center 2300 to other data centers 2360, for example from a VM 2324 on a host 2320 in data center 2300 to another VM on another host in another, similar data center 2360, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 2318A-2318N, as virtualized resources to customers of a network provider in a similar manner.

Figure 24:
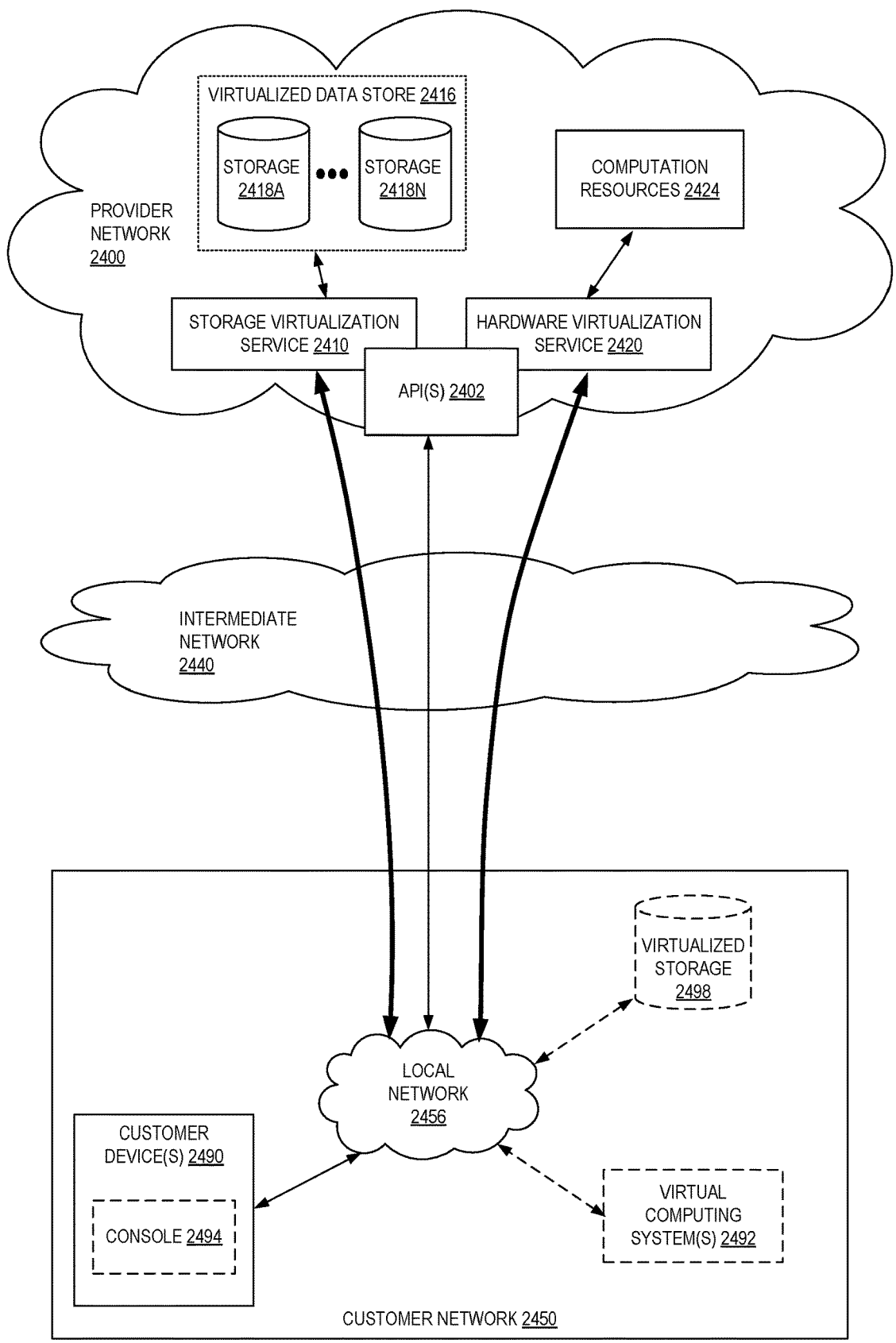
FIG. 24 is a block diagram of an example provider network that provides a storage virtualization service and a hardware virtualization service to customers according to some embodiments.

FIG. 24 is a block diagram of an example provider network that provides a storage virtualization service and a hardware virtualization service to customers, according to some embodiments. Hardware virtualization service 2420 provides multiple computation resources 2424 (e.g., VMs) to customers. The computation resources 2424 may, for example, be rented or leased to customers of the provider network 2400 (e.g., to a customer that implements customer network 2450). Each computation resource 2424 may be provided with one or more local IP addresses. Provider network 2400 may be configured to route packets from the local IP addresses of the computation resources 2424 to public Internet destinations, and from public Internet sources to the local IP addresses of computation resources 2424.

Provider network 2400 may provide a customer network 2450, for example coupled to intermediate network 2440 via local network 2456, the ability to implement virtual computing systems 2492 via hardware virtualization service 2420 coupled to intermediate network 2440 and to provider network 2400. In some embodiments, hardware virtualization service 2420 may provide one or more APIs 2402, for example a web services interface, via which a customer network 2450 may access functionality provided by the hardware virtualization service 2420, for example via a console 2494 (e.g., a web-based application, standalone application, mobile application, etc.). In some embodiments, at the provider network 2400, each virtual computing system 2492 at customer network 2450 may correspond to a computation resource 2424 that is leased, rented, or otherwise provided to customer network 2450.

From an instance of a virtual computing system 2492 and/or another customer device 2490 (e.g., via console 2494), the customer may access the functionality of storage virtualization service 2410, for example via one or more APIs 2402, to access data from and store data to storage resources 2418A-2418N of a virtual data store 2416 provided by the provider network 2400. In some embodiments, a virtualized data store gateway (not shown) may be provided at the customer network 2450 that may locally cache at least some data, for example frequently accessed or critical data, and that may communicate with virtualized data store service 2410 via one or more communications channels to upload new or modified data from a local cache so that the primary store of data (virtualized data store 2416) is maintained. In some embodiments, a user, via a virtual computing system 2492 and/or on another customer device 2490, may mount and access virtual data store 2416 volumes, which appear to the user as local virtualized storage 2498.

While not shown in FIG. 24, the virtualization service(s) may also be accessed from resource instances within the provider network 2400 via API(s) 2402. For example, a customer, appliance service provider, or other entity may access a virtualization service from within a respective virtual network on the provider network 2400 via an API 2402 to request allocation of one or more resource instances within the virtual network or within another virtual network.

Illustrative System

Figure 25:
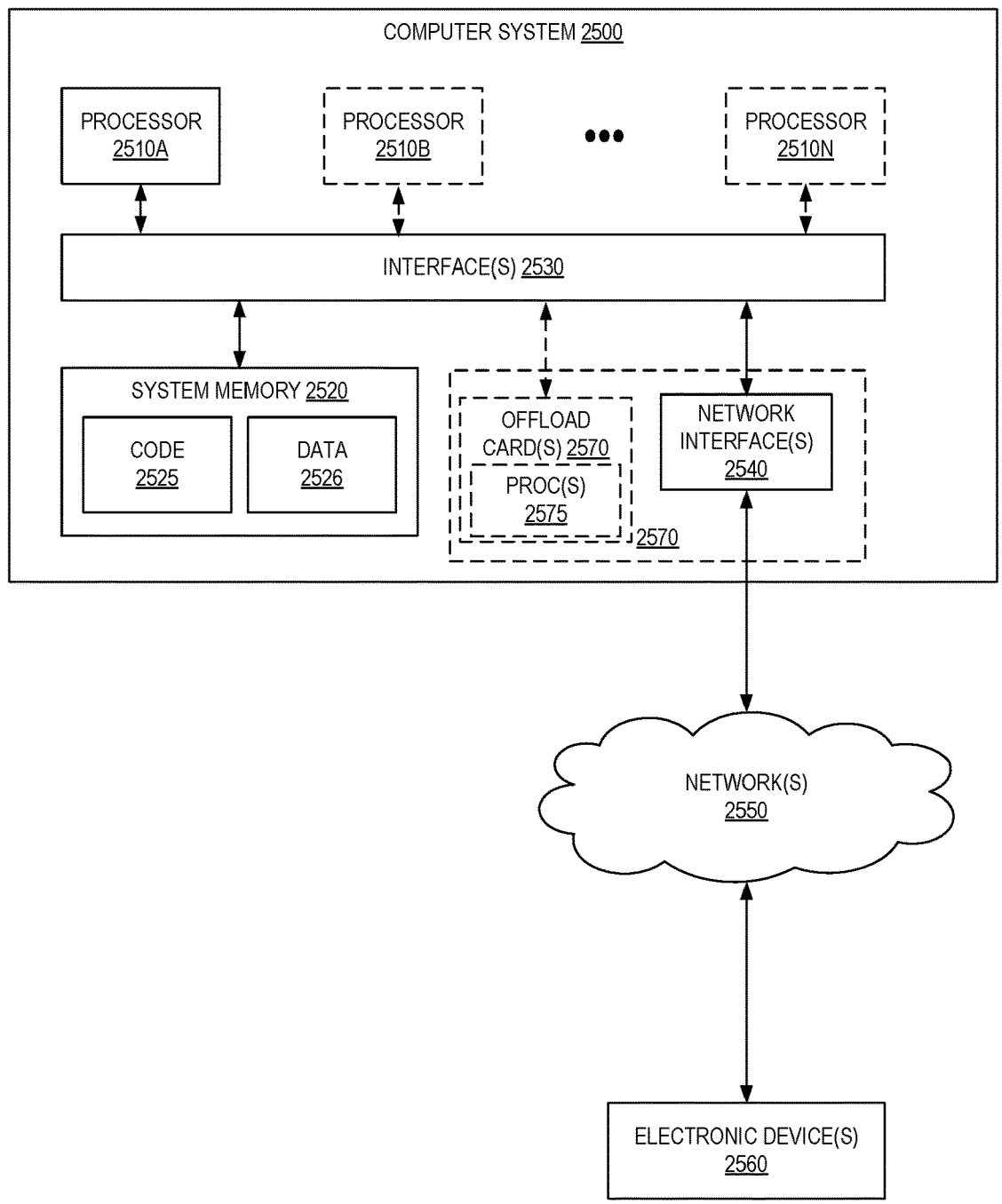
FIG. 25 is a block diagram illustrating an example computer system that may be used in some embodiments.

In some embodiments, a system that implements a portion or all of the techniques for remote job handling as described herein may include a general-purpose computer system that includes or is configured to access one or more computer-accessible media, such as computer system 2500 illustrated in FIG. 25. In the illustrated embodiment, computer system 2500 includes one or more processors 2510 coupled to a system memory 2520 via an input/output (I/O) interface 2530. Computer system 2500 further includes a network interface 2540 coupled to I/O interface 2530. While FIG. 25 shows computer system 2500 as a single computing device, in various embodiments a computer system 2500 may include one computing device or any number of computing devices configured to work together as a single computer system 2500.

In various embodiments, computer system 2500 may be a uniprocessor system including one processor 2510, or a multiprocessor system including several processors 2510 (e.g., two, four, eight, or another suitable number). Processors 2510 may be any suitable processors capable of executing instructions. For example, in various embodiments, processors 2510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 2510 may commonly, but not necessarily, implement the same ISA.

System memory 2520 may store instructions and data accessible by processor(s) 2510. In various embodiments, system memory 2520 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 2520 as code 2525 and data 2526.

In one embodiment, I/O interface 2530 may be configured to coordinate I/O traffic between processor 2510, system memory 2520, and any peripheral devices in the device, including network interface 2540 or other peripheral interfaces. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments some or all of the functionality of I/O interface 2530, such as an interface to system memory 2520, may be incorporated directly into processor 2510.

Network interface 2540 may be configured to allow data to be exchanged between computer system 2500 and other devices 2560 attached to a network or networks 2550, such as other computer systems or devices as illustrated in FIG. 1, for example. In various embodiments, network interface 2540 may support communication via any suitable wired or wireless general data networks, such as types of Ethernet network, for example. Additionally, network interface 2540 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 2500 includes one or more offload cards 2570 (including one or more processors 2575, and possibly including the one or more network interfaces 2540) that are connected using an I/O interface 2530 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 2500 may act as a host electronic device (e.g., operating as part of a hardware virtualization service) that hosts compute instances, and the one or more offload cards 2570 execute a virtualization manager that can manage compute instances that execute on the host electronic device. As an example, in some embodiments the offload card(s) 2570 can perform compute instance management operations such as pausing and/or un-pausing compute instances, launching and/or terminating compute instances, performing memory transfer/copying operations, etc. These management operations may, in some embodiments, be performed by the offload card(s) 2570 in coordination with a hypervisor (e.g., upon a request from a hypervisor) that is executed by the other processors 2510A-2510N of the computer system 2500. However, in some embodiments the virtualization manager implemented by the offload card(s) 2570 can accommodate requests from other entities (e.g., from compute instances themselves), and may not coordinate with (or service) any separate hypervisor.

In some embodiments, system memory 2520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2500 via I/O interface 2530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 2500 as system memory 2520 or another type of memory. Further, a computer-accessible medium may include transmission media or signals such as electrical, electromagnetic, or digital signals, conveyed via a communication medium such as a network and/or a wireless link, such as may be implemented via network interface 2540.

Figure 26:
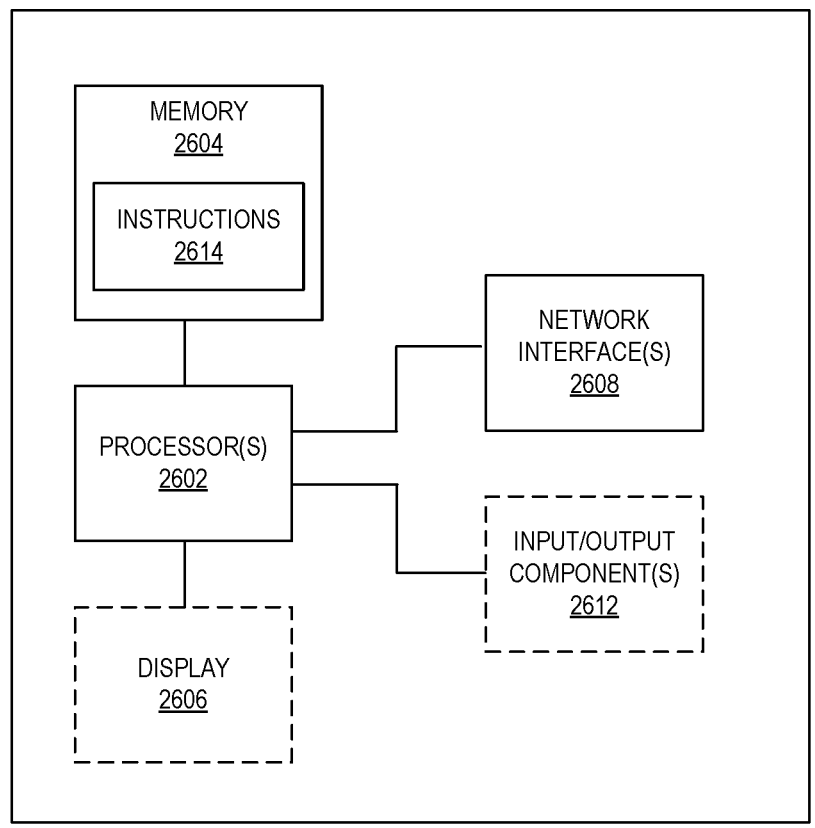
FIG. 26 illustrates a logical arrangement of a set of general components of an exemplary computing device that can be utilized in accordance with various embodiments.

FIG. 26 illustrates a logical arrangement of a set of general components of an example computing device 2600 such as web services provider, etc. Generally, a computing device 2600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 2602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 2604) to store code (e.g., instructions 2614) and/or data, and a set of one or more wired or wireless network interfaces 2608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 2604) of a given electronic device typically stores code (e.g., instructions 2614) for execution on the set of one or more processors 2602 of that electronic device. One or more parts of various embodiments may be implemented using different combinations of software, firmware, and/or hardware.

A computing device 2600 can include some type of display element 2606, such as a touch screen or liquid crystal display (LCD), although many devices such as portable media players might convey information via other means, such as through audio speakers, and other types of devices such as server end stations may not have a display element 2606 at all. As discussed, some computing devices used in some embodiments include at least one input and/or output component(s) 2612 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 27:
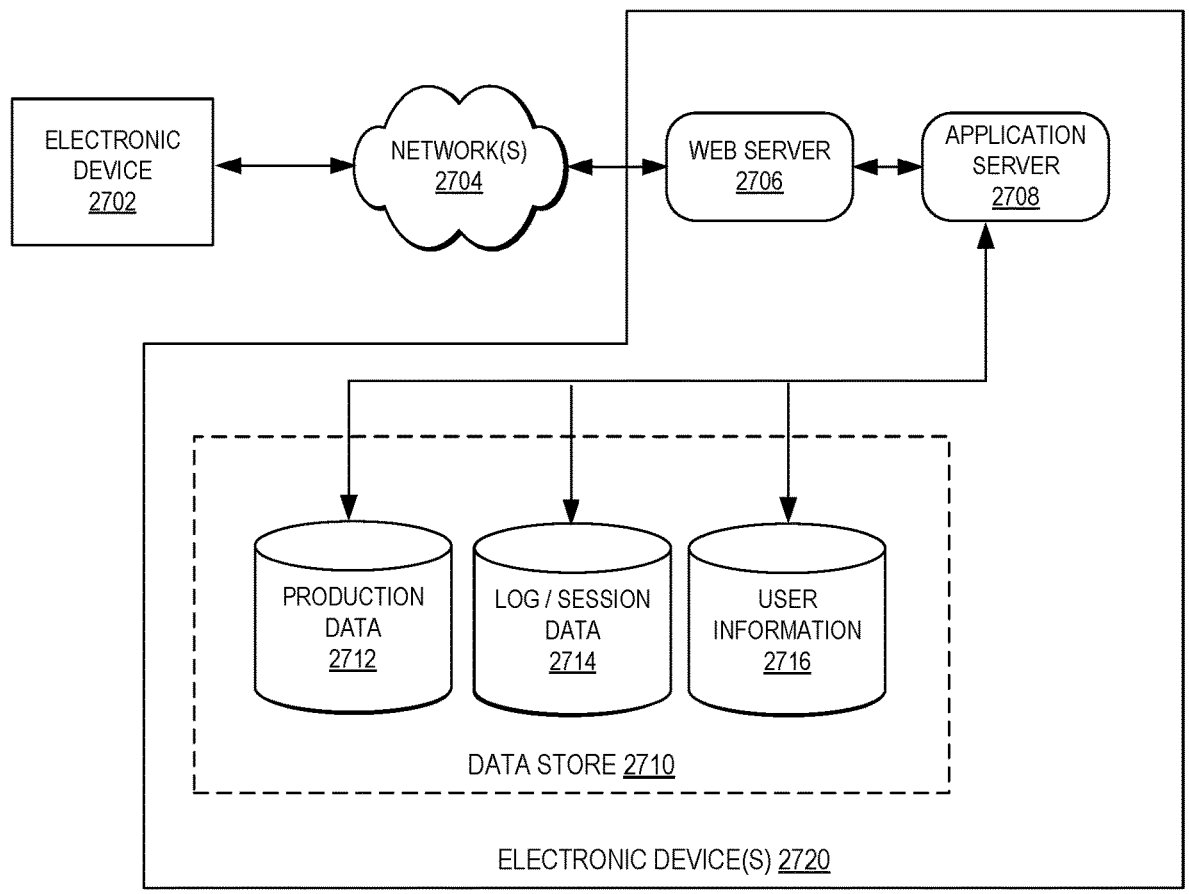
FIG. 27 illustrates an example of an environment for implementing aspects in accordance with various embodiments.

As discussed, different approaches can be implemented in various environments in accordance with the described embodiments. For example, FIG. 27 illustrates an example of an environment 2700 for implementing aspects in accordance with various embodiments. For example, in some embodiments commands are HyperText Transfer Protocol (HTTP) requests that are received by a web server (e.g., web server 2706), and the users, via electronic devices, may interact with the provider network via a web portal provided via the web server 2706 and application server 2708. As will be appreciated, although a web-based environment is used for purposes of explanation, different environments may be used, as appropriate, to implement various embodiments. The system includes an electronic client device 2702, which may also be referred to as a client device and can be any appropriate device operable to send and receive requests, messages or information over an appropriate network 2704 and convey information back to a user of the device 2702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2704 includes the Internet, as the environment includes a web server 2706 for receiving requests and serving content in response thereto, although for other networks an alternative device serving a similar purpose could be used, as would be apparent to one of ordinary skill in the art.

The illustrative environment includes at least one application server 2708 and a data store 2710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 2708 can include any appropriate hardware and software for integrating with the data store 2710 as needed to execute aspects of one or more applications for the client device 2702 and handling a majority of the data access and business logic for an application. The application server 2708 provides access control services in cooperation with the data store 2710 and is able to generate content such as text, graphics, audio, video, etc., to be transferred to the client device 2702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2702 and the application server 2708, can be handled by the web server 2706. It should be understood that the web server 2706 and application server 2708 are not required and are merely example components, as structured code discussed herein can be executed on any appropriate device or host machine as discussed elsewhere herein.

The data store 2710 can include several separate data tables, databases, or other data storage mechanisms and media for storing data relating to a particular aspect. For example, the data store illustrated includes mechanisms for storing production data 2712 and user information 2716, which can be used to serve content for the production side. The data store 2710 also is shown to include a mechanism for storing log or session data 2714. It should be understood that there can be many other aspects that may need to be stored in the data store, such as page image information and access rights information, which can be stored in any of the above listed mechanisms as appropriate or in additional mechanisms in the data store 2710. The data store 2710 is operable, through logic associated therewith, to receive instructions from the application server 2708 and obtain, update, or otherwise process data in response thereto. In one example, a user might submit a search request for a certain type of item. In this case, the data store 2710 might access the user information 2716 to verify the identity of the user and can access a production data 2712 to obtain information about items of that type. The information can then be returned to the user, such as in a listing of results on a web page that the user is able to view via a browser on the user device 2702. Information for a particular item of interest can be viewed in a dedicated page or window of the browser.

The web server 2706, application server 2708, and/or data store 2710 may be implemented by one or more electronic devices 2720, which can also be referred to as electronic server devices or server end stations, and may or may not be located in different geographic locations. Each of the one or more electronic devices 2720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 27. Thus, the depiction of the environment 2700 in FIG. 27 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclsoure as set forth in the claims.

FIG. 26 illustrates a logical arrangement of a set of general components of an example computing device 2600 such as the web services provider, etc. Generally, a computing device 2600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 2602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 2604) to store code (e.g., instructions 2614) and/or data, and a set of one or more wired or wireless network interfaces 2608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 2604) of a given electronic device typically stores code (e.g., instructions 2614) for execution on the set of one or more processors 2602 of that electronic device. One or more parts of various embodiments may be implemented using different combinations of software, firmware, and/or hardware.

A computing device 2600 can include some type of display element 2606, such as a touch screen or liquid crystal display (LCD), although many devices such as portable media players might convey information via other means, such as through audio speakers, and other types of devices such as server end stations may not have a display element 2606 at all. As discussed, some computing devices used in some embodiments include at least one input and/or output component(s) 2612 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

As discussed, different approaches can be implemented in various environments in accordance with the described embodiments. For example, FIG. 27 illustrates an example of an environment 2700 for implementing aspects in accordance with various embodiments. For example, in some embodiments commands are HyperText Transfer Protocol (HTTP) requests that are received by a web server (e.g., web server 2706), and the users, via electronic devices, may interact with the provider network via a web portal provided via the web server 2706 and application server 2708. As will be appreciated, although a web-based environment is used for purposes of explanation, different environments may be used, as appropriate, to implement various embodiments. The system includes an electronic client device 2702, which may also be referred to as a client device and can be any appropriate device operable to send and receive requests, messages or information over an appropriate network 2704 and convey information back to a user of the device 2702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2704 includes the Internet, as the environment includes a web server 2706 for receiving requests and serving content in response thereto, although for other networks an alternative device serving a similar purpose could be used, as would be apparent to one of ordinary skill in the art.

The illustrative environment includes at least one application server 2708 and a data store 2710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 2708 can include any appropriate hardware and software for integrating with the data store 2710 as needed to execute aspects of one or more applications for the client device 2702 and handling a majority of the data access and business logic for an application. The application server 2708 provides access control services in cooperation with the data store 2710 and is able to generate content such as text, graphics, audio, video, etc., to be transferred to the client device 2702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2702 and the application server 2708, can be handled by the web server 2706. It should be understood that the web server 2706 and application server 2708 are not required and are merely example components, as structured code discussed herein can be executed on any appropriate device or host machine as discussed elsewhere herein.

The data store 2710 can include several separate data tables, databases, or other data storage mechanisms and media for storing data relating to a particular aspect. For example, the data store illustrated includes mechanisms for storing production data 2712 and user information 2716, which can be used to serve content for the production side. The data store 2710 also is shown to include a mechanism for storing log or session data 2714. It should be understood that there can be many other aspects that may need to be stored in the data store, such as page image information and access rights information, which can be stored in any of the above listed mechanisms as appropriate or in additional mechanisms in the data store 2710. The data store 2710 is operable, through logic associated therewith, to receive instructions from the application server 2708 and obtain, update, or otherwise process data in response thereto. In one example, a user might submit a search request for a certain type of item. In this case, the data store 2710 might access the user information 2716 to verify the identity of the user and can access a production data 2712 to obtain information about items of that type. The information can then be returned to the user, such as in a listing of results on a web page that the user is able to view via a browser on the user device 2702. Information for a particular item of interest can be viewed in a dedicated page or window of the browser.

The web server 2706, application server 2708, and/or data store 2710 may be implemented by one or more electronic devices 2720, which can also be referred to as electronic server devices or server end stations, and may or may not be located in different geographic locations. Each of the one or more electronic devices 2720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 27. Thus, the depiction of the environment 2700 in FIG. 27 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a start job command, from an interactive programming environment, to start a training job for a machine learning algorithm on a web services provider system, wherein the start job command is generated by the interactive programming environment and includes an indication of a location of a container storing the machine learning algorithm, a location of training data, a location to store a model, resources to be used by the container, and a stopping condition;
accessing the training data to be used to train the machine learning algorithm;
instantiating the container storing the machine learning algorithm;
running the job using the instantiated container to train the machine learning algorithm using the accessed training data and produce the model; and
providing metrics and log data during the running of the job to the interactive programming environment.

2. The computer-implemented method of claim 1, wherein the start job command further includes a job name.

3. A computer-implemented method comprising:
receiving a job command, from a client, applicable to a job for a machine learning algorithm on a web services provider system, wherein the job command includes an indication of a location of a container storing the machine learning algorithm, a location of training data, a location to store a model, resources to be used by the container, and a stopping condition;

processing the job command using at least one of a training instance and an inference instance, wherein processing the job command comprises:

accessing the training data to be used to train the machine learning algorithm, and instantiating the container storing the machine learning algorithm; and providing metrics and log data during the processing of the job to the client.

4. The computer-implemented method of claim 3, wherein the job command is a command to start the job for the machine learning algorithm and further includes a job name.

5. The computer-implemented method of claim 4, wherein processing the job command further comprises training the machine learning algorithm using the training data in the training instance.

6. The computer-implemented method of claim 4, wherein processing the job command further comprises training the machine learning algorithm using feature processed training data in the training instance.

7. The computer-implemented method of claim 4, wherein processing the job command further comprises evaluating the machine learning model using evaluation data in the inference instance.

8. The computer-implemented method of claim 3, wherein the job is a training job for the machine learning model and the job command is a command to stop the training job for the machine learning algorithm and includes a job name.

9. The computer-implemented method of claim 3, wherein the job command is a command to stop an evaluation job for the machine learning model and includes a job name.

10. The computer-implemented method of claim 9, wherein processing the job command further comprises training the machine learning algorithm using training data in the training instance.

11. The computer-implemented method of claim 9, wherein processing the job command further comprises evaluating the machine learning model using evaluation data in the inference instance.

12. The computer-implemented method of claim 3, wherein the job command is a command to modify an existing job for the machine learning algorithm and further includes a job name, hyperparameters, and resources to be used, wherein at least one of the locations, hyperparameters, and resources has changed from an initial indication.

13. A system comprising:
a first one or more physical computing devices of a service provider network to execute training instances that train machine learning (ML) models and to execute inference instances that host ML models;

a second one or more physical computing devices to implement a control plane of the service provider network, the control plane comprising instructions which when executed cause the control plane to:

receive a job command, from a client device, applicable to a job for a machine learning algorithm, wherein the job command is generated by an interactive programming environment executed by the client device and includes an indication of a location of a container storing the machine learning algorithm, a location of training data, a location to store a model, resources to be used by the container, and a stopping condition;

cause the job command to be processed using at least one of a training instance or an inference instance, wherein causing the job command to be processed comprises:

accessing the training data to be used to train the machine learning algorithm, and instantiating the container storing the machine learning algorithm; and provide metrics and log data during the processing of the job to the programming environment.

14. The system of claim 13, wherein the job command is a command to start the job for the machine learning algorithm and further includes a job name.

15. The system of claim 14, wherein to cause the job command to be processed further comprises to train the machine learning algorithm using training data in the training instance.

16. The system of claim 14, wherein to cause the job command to be processed further comprises to train the machine learning algorithm using feature processed training data in the training instance.

17. The system of claim 14, wherein to cause the job command to be processed further comprises to evaluate the machine learning model using evaluation data in the inference instance.

18. The system of claim 14, wherein the job is a job training job for the machine learning model and the job command is a command to stop the training job for the machine learning algorithm and includes a job name.

19. The system of claim 13, wherein the job is the evaluation job for the machine learning model and job command is a command to stop the evaluation job for the machine learning model and includes a job name.

\* \* \* \* \*